(12) United States Patent
Kojima

(10) Patent No.: US 9,137,641 B2
(45) Date of Patent: Sep. 15, 2015

(54) WIRELESS COMMUNICATION SYSTEM, BASE STATION, AND TERMINAL

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 13/748,144

(22) Filed: Jan. 23, 2013

(65) Prior Publication Data

US 2013/0242843 A1    Sep. 19, 2013

(30) Foreign Application Priority Data

Mar. 16, 2012  (JP) ................ 2012-061267

(51) Int. Cl.
| | |
|---|---|
| H04W 4/06 | (2009.01) |
| H04W 88/06 | (2009.01) |
| H04W 76/02 | (2009.01) |
| H04L 12/709 | (2013.01) |
| H04W 72/04 | (2009.01) |

(52) U.S. Cl.
CPC ............... *H04W 4/06* (2013.01); *H04L 45/245* (2013.01); *H04W 76/025* (2013.01); *H04W 88/06* (2013.01); *H04W 72/0406* (2013.01)

(58) Field of Classification Search
CPC ... H04W 4/06; H04W 88/06; H04W 72/0406; H04W 76/025; H04W 16/14; H04L 45/245
See application file for complete search history.

(56) References Cited

U.S. PATENT DOCUMENTS

| | | | |
|---|---|---|---|
| 2008/0279132 A1 | 11/2008 | Noishiki et al. | |
| 2011/0003590 A1* | 1/2011 | Yoon et al. | 455/432.1 |
| 2011/0249571 A1* | 10/2011 | Das et al. | 370/252 |
| 2012/0170490 A1* | 7/2012 | Lee et al. | 370/259 |
| 2012/0231770 A1* | 9/2012 | Clarke et al. | 455/414.1 |
| 2013/0021968 A1* | 1/2013 | Reznik et al. | 370/328 |
| 2013/0064198 A1* | 3/2013 | Krishnaswamy et al. | 370/329 |
| 2013/0083783 A1* | 4/2013 | Gupta et al. | 370/338 |
| 2014/0043979 A1* | 2/2014 | Etemad et al. | 370/237 |
| 2014/0050086 A1* | 2/2014 | Himayat et al. | 370/230 |

FOREIGN PATENT DOCUMENTS

JP    2008-283524 A    11/2008

* cited by examiner

*Primary Examiner* — Min Jung
(74) *Attorney, Agent, or Firm* — Arent Fox LLP

(57) ABSTRACT

A wireless communication system including: a terminal, and a base station that forwards a traffic flow to the terminal, wherein the terminal includes a plurality of first wireless interfaces, and a first processor that selects a first wireless interface from among the plurality of first wireless interfaces, the first wireless interface from which to transmit a response packet in response to a multicast packet or broadcast packet, based on first information indicating the operational states of the plurality of first wireless interfaces, and the preferability of link aggregation on the traffic flow that follows the response packet.

11 Claims, 25 Drawing Sheets

FIG. 6

| DESTINATION | IF (OUTPUT INTERFACE) |
|---|---|
| PEER ADDRESS | WLAN INTERFACE |

FIG. 12

| NO. | PACKET | LTE-Inf | WLAN-Inf | BEHAVIOR |
|---|---|---|---|---|
| 1 | CONTROL-RELATED MULTICAST | DC | NORMAL | FEMTO BASE STATION DISCARDS |
| 2 | | DC | PS / LINK DOWN | FEMTO BASE STATION FORWARDS |

FIG. 14

| NO. | PACKET | LTE-Inf | WLAN-Inf | SUBSEQUENT FLOW | OPERATIONAL POLICY | BEHAVIOR |
|---|---|---|---|---|---|---|
| 3 | RESPONSE PACKET (ROUTE DETERMINATION PACKET) | NORMAL | DC | | – | TRANSMIT FROM LTE-INF |
| 4 | | IDLE | DC | LA PREFERRED | ROUTE CONTROL BY ENCAPSULATION | ENCAPSULATE WITH FEMTO BASE STATION ADDRESS AND TRANSMIT FROM WLAN-INF |
| 5 | | IDLE | DC | | ROUTE CONTROL BY LA-ENABLED INTERFACE | TRANSMIT FROM LTE-INF |
| 6 | | IDLE | DC | LA NOT PREFERRED | – | TRANSMIT FROM WLAN-INF |
| 7 | | NORMAL | LINK-DOWN | | – | TRANSMIT FROM LTE-INF |
| 8 | | NORMAL | NORMAL | | – | TRANSMIT FROM WLAN-INF |

FIG. 24

| NO. | LA PREFERABILITY | LTE RECEPTION QUALITY | WLAN RECEPTION QUALITY | LA EFFECTIVENESS |
|---|---|---|---|---|
| 101 | LA PREFERRED | GOOD | NORMAL | HIGH |
| 102 | LA PREFERRED | EITHER OR BOTH POOR | | LOW |
| 103 | LA NOT PREFERRED | DC | | LOW |

FIG. 25

| NO. | PACKET | LTE-Inf | WLAN-Inf | SUBSEQUENT FLOW | OPERATIONAL POLICY | BEHAVIOR |
|---|---|---|---|---|---|---|
| 3 | RESPONSE PACKET (ROUTE DETERMINATION PACKET) | NORMAL | DC | LA HIGHLY EFFECTIVE | – | TRANSMIT FROM LTE-INF |
| 4 | | IDLE | DC | | ROUTE CONTROL BY ENCAPSULATION | ENCAPSULATE WITH FEMTO BASE STATION ADDRESS AND TRANSMIT FROM WLAN-INF |
| 5 | | IDLE | DC | LA LOWLY EFFECTIVE | ROUTE CONTROL BY LA-ENABLED INTERFACE | TRANSMIT FROM LTE-INF |
| 6 | | IDLE | LINK-DOWN | | – | TRANSMIT FROM WLAN-INF |
| 7 | | NORMAL | NORMAL | | – | TRANSMIT FROM LTE-INF |
| 8 | | | | | – | TRANSMIT FROM INTERFACE WITH BETTER RECEPTION QUALITY |

WIRELESS COMMUNICATION SYSTEM, BASE STATION, AND TERMINAL

CROSS-REFERENCE TO RELATED APPLICATION

This application is based upon and claims the benefit of priority of the prior Japanese Patent Application No. 2012-061267, filed on Mar. 16, 2012, the entire contents of which are incorporated herein by reference.

FIELD

The embodiments discussed herein are related to a wireless communication system, base station and terminal.

BACKGROUND

In the future, it is expected that compact base stations having an interface for a next-gen cellular wireless communication format called Long Term Evolution (LTE) will be introduced into residential homes. Such a compact base station may be called a femto base station (femto BS).

Meanwhile, wireless local area networks (WLAN) are already prevalent in residential homes. In homes where WLANs are prevalent, it is anticipated that terminals, or in other words, mobile stations (MS) will exist in a wireless communication environment where a variety of wireless access methods are available. For example, a wireless communication environment where both LTE-based wireless access and WLAN-based wireless access are available is anticipated.

In a wireless communication environment where a variety of wireless access methods are available, terminals having both LTE and WLAN wireless interfaces may be coupled to a home network. In some cases, terminals having both LTE and WLAN wireless adapters may be coupled to a home network LAN.

Moreover, a wireless communication system which has multiple wireless links in different formats and in which a higher node determines on a lower node to perform a multicast has been disclosed (see Japanese Laid-open Patent Publication No. 2008-283524, for example).

SUMMARY

According to an aspect of the invention, a wireless communication system including: a terminal, and a base station that forwards a traffic flow to the terminal, wherein the terminal includes a plurality of first wireless interfaces, and a first processor that selects a first wireless interface from among the plurality of first wireless interfaces, the first wireless interface from which to transmit a response packet in response to a multicast packet or broadcast packet, based on first information indicating the operational states of the plurality of first wireless interfaces, and the preferability of link aggregation on the traffic flow that follows the response packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a routing table.

FIG. 12 illustrates a behavior pattern table for a femto base station according to an embodiment.

FIG. 14 illustrates a behavior pattern table for a terminal according to an embodiment.

FIG. 24 illustrates an LA effectiveness decision table according to an embodiment.

FIG. 25 illustrates a behavior pattern table according to an embodiment.

DESCRIPTION OF EMBODIMENTS

Hereinafter, embodiments will be described based on the drawings.

Note that in all drawings used to describe the embodiments, like signs are used for portions with like functions, and repeated description thereof will be reduced or omitted.

While inventing the present embodiments, observations were made regarding a related art. Such observations include the following, for example.

Figure 1:
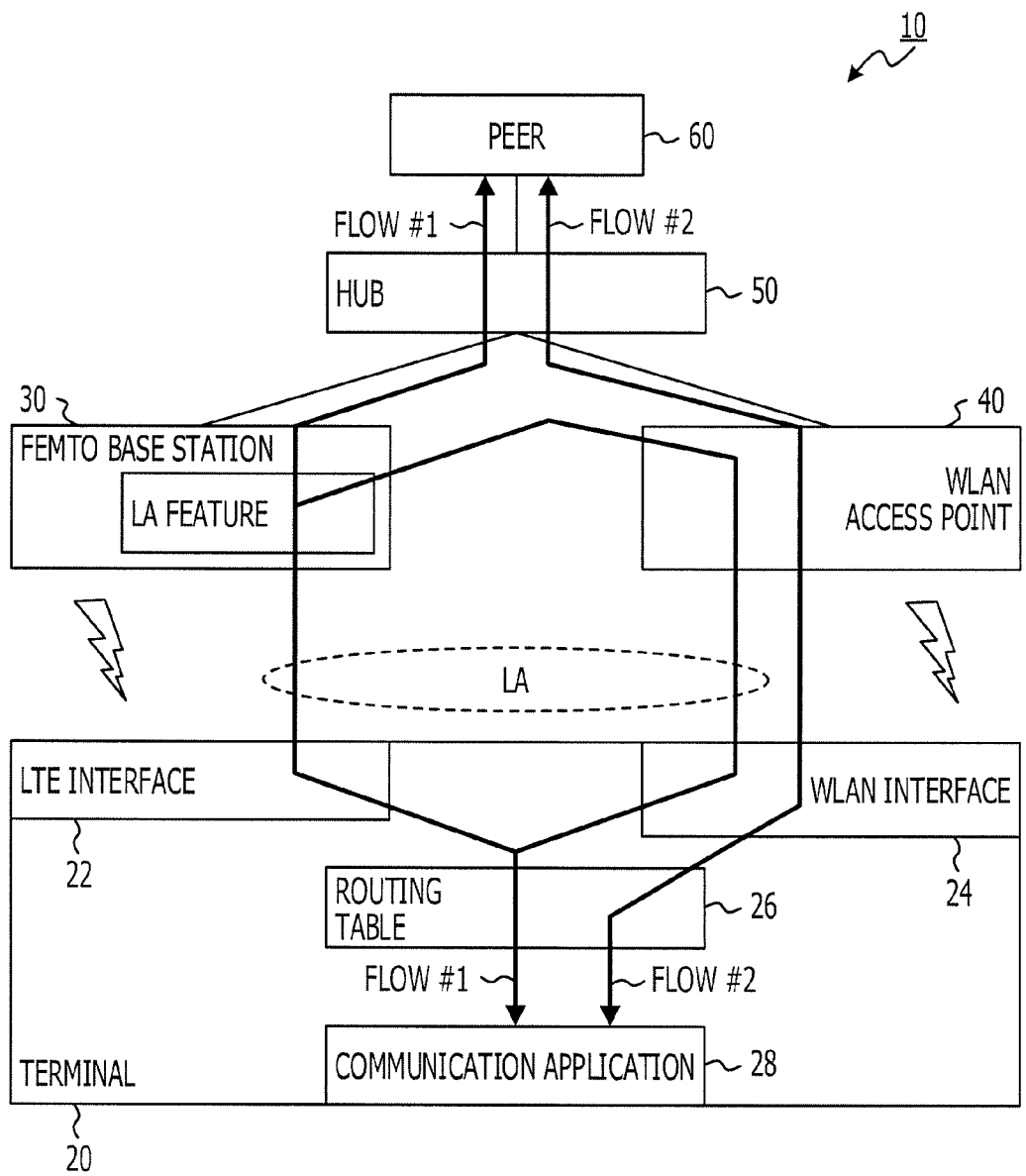
FIG. 1 illustrates an example of a wireless communication system.

FIG. 1 illustrates an example of a wireless communication system 10 of a related art. The wireless communication system 10 includes a terminal 20, a femto base station 30, a WLAN access point (AP) 40, and a hub 50. A home network (hereinafter designated "network") may be realized by the terminal 20, the femto base station 30, the WLAN access point (AP) 40, and the hub 50.

The terminal 20 includes an LTE interface 22 and a WLAN interface 24. The LTE interface 22 wirelessly accesses the femto base station 30 by using the LTE standard. The WLAN interface 24 wirelessly accesses the WLAN access point 40 by using a WLAN technology.

The peer 60 represents a terminal that communicates with the terminal 20.

The network is a single multicast or broadcast domain. In other words, multicast packets or broadcast packets transmitted by the terminal 20, which is coupled to the network, reach all other terminals coupled to the network. In the example of a network illustrated in FIG. 1, multicast or broadcast packets transmitted by the peer 60 arrive at the LTE interface 22 or the WLAN interface 24 of the terminal 20.

However, packets may not reach all other terminals coupled to the network when the Internet Group Management Protocol (IGMP) snooping feature is enabled in the hub 50. When requesting content-related multicast packets such as video, the terminal 20 transmits a message for joining a multicast group (that is, an IGMP Join message) to the multicast packet address. The hub 50 transmits content-related multicast packets such as video to the port where a multicast group join message has been received.

For example, the terminal 20 may transmit an IGMP Join message that relates to a given multicast from the WLAN interface 24. The hub 50 transmits content-related multicast packets corresponding to that multicast to the port that couples to that WLAN interface 24.

Consequently, the flow of content-related multicast packets corresponding to a particular multicast becomes like a unicast flow between the WLAN access point 40 and the WLAN interface 24 of the terminal 20. Meanwhile, control-related multicast packets are copied in the hub 50 and reach all terminals coupled to the network. Broadcast packets are similarly copied in the hub 50 and reach all terminals coupled to the network, without distinguishing between content-related and control-related packets.

In the home network realized by the wireless communication system 10, the femto base station 30 provides a link aggregation (LA) feature, which simultaneously uses LTE links and WLAN links, for flows such as traffic flows. Using the LA feature enables improved throughput.

Usage of the LA feature for unicast will now be described with reference to FIG. 1.

The LA feature is implemented in the femto base station 30. Flow #1 passes through the femto base station 30, and for which the LA feature of the femto base station 30 may be used. Since the LA feature of the femto base station 30 can be used, flow #1 is LA-enabled. Flow #2 does not pass through the femto base station 30, and for which the LA feature of the femto base station 30 is unable to be used. Since the LA feature of the femto base station 30 is unable to be used, flow #2 is LA-disabled.

Whether a flow becomes flow #1 that passes through the femto base station 30 or flow #2 that doesn't pass through the femto base station 30 depends on a route determination packet transmitted by the terminal 20. This is because a flow's route is determined by the route determination packet. Specifically, when the terminal 20 has transmitted a route determination packet from the LTE interface 22, the packet route following the route determination packet becomes an LA-enabled route. This is because the packet flow following the route determination packet becomes flow #1. Conversely, when the terminal 20 has transmitted a route determination packet from the WLAN interface 24, the packet route following the route determination packet becomes an LA-disabled route. This is because the packet flow following the route determination packet becomes flow #2.

Figure 2:
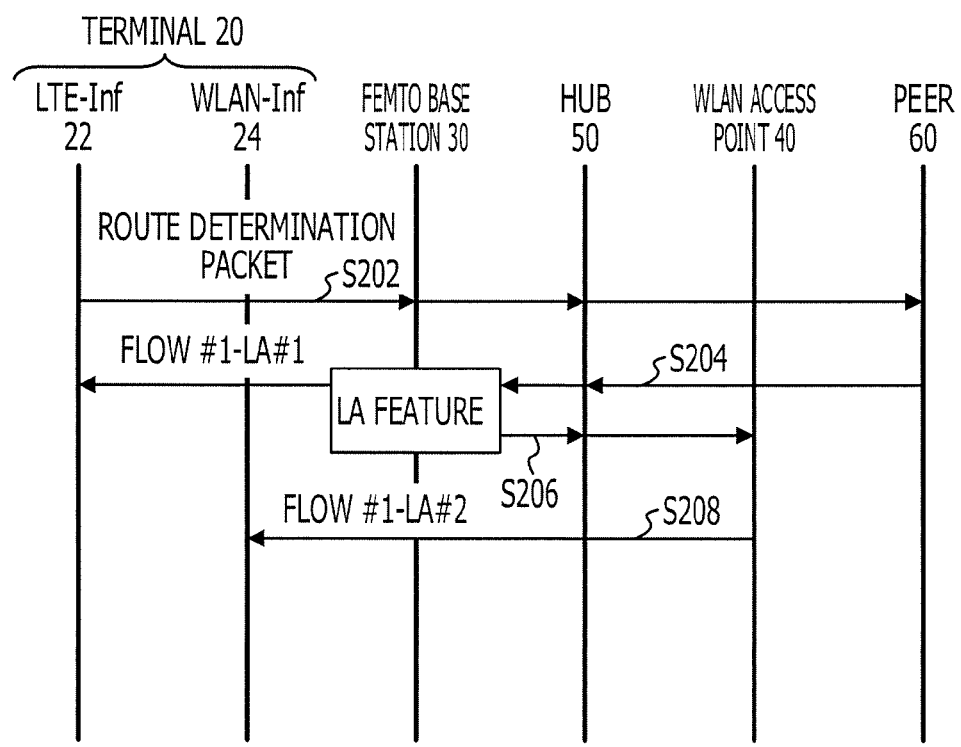
FIG. 2 is a sequence chart for when an LA-enabled route is set.

FIG. 2 illustrates a sequence for when an LA-enabled route is set.

In step S202, the terminal 20 transmits a route determination packet from the LTE interface (LTE-Inf) 22. The route determination packet reaches the peer 60 via the femto base station 30 and the hub 50.

In step S204, the peer 60 transmits a flow #1 packet addressed to the source of the route determination packet. Specifically, the peer 60 transmits a packet addressed to the address assigned to the LTE interface 22. Since the route determination packet was transmitted from the LTE interface 22, the packet transmitted by the peer 60 is able to use the LA feature by means of the femto base station 30. The femto base station 30 performs LA for the flow from the peer 60. The femto base station 30 uses an LTE link to transmit a given packet.

In step S206, the femto base station 30 transmits another packet to the WLAN access point 40, which differs from the packet transmitted using the LTE link.

In step S208, the WLAN access point 40 transmits the other packet, which is from the femto base station 30, using a WLAN link. The other packet is received by the WLAN interface (WLAN-Inf) 24 of the terminal 20.

As illustrated in FIG. 2, the femto base station 30 is able to perform LA on a flow #1 using the LA feature.

Figure 3:
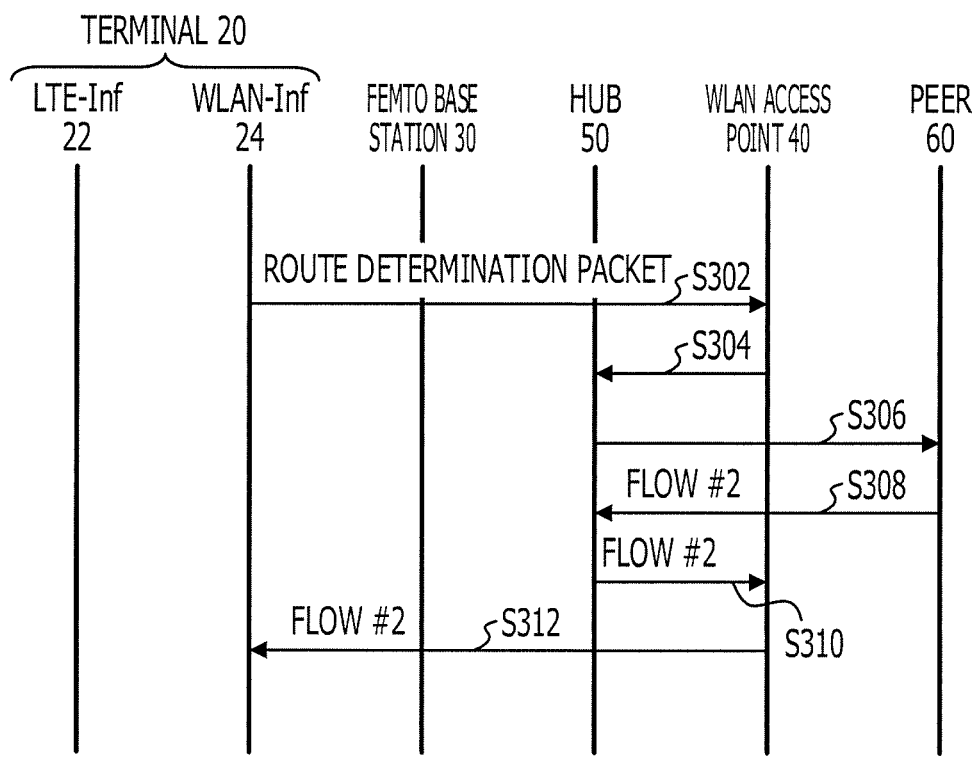
FIG. 3 is a sequence chart for when an LA-disabled route is set.

FIG. 3 illustrates a sequence for when an LA-disabled route is set.

In step S302, the terminal 20 transmits a route determination packet from the WLAN interface 24. The route determination packet reaches the WLAN access point 40.

In step S304, the WLAN access point 40 transmits the route determination packet to the hub 50.

In step S306, the hub 50 transmits the route determination packet to the peer 60.

In step S308, the peer 60 transmits a flow #2 packet addressed to the source of the route determination packet. Specifically, the peer 60 transmits a packet addressed to the address assigned to the WLAN interface 24. The packet transmitted by the peer 60 reaches the hub 50.

In step S310, the hub 50 transmits the packet that is from the peer 60 to the WLAN access point 40.

In step S312, the WLAN access point 40 transmits the packet from the hub 50 to the terminal 20. The packet is received by the WLAN interface 24 of the terminal 20.

As illustrated in FIG. 3, the flow from the peer 60 reaches the terminal 20 without passing through the femto base station 30. Since the flow does not pass through the femto base station 30, the femto base station 30 does not perform LA on the flow #2.

Specifically, an address such as an internet protocol (IP) address or media access control (MAC) address is included in the source address of a route determination packet.

Also, when the flow is a unicast flow, the route determination packet for the flow may be a flow start packet for the unicast flow. Meanwhile, when the flow is a content-related multicast flow such as video, the route determination packet for the flow may be a multicast group join message (for example, an IGMP Join message).

Figure 4:
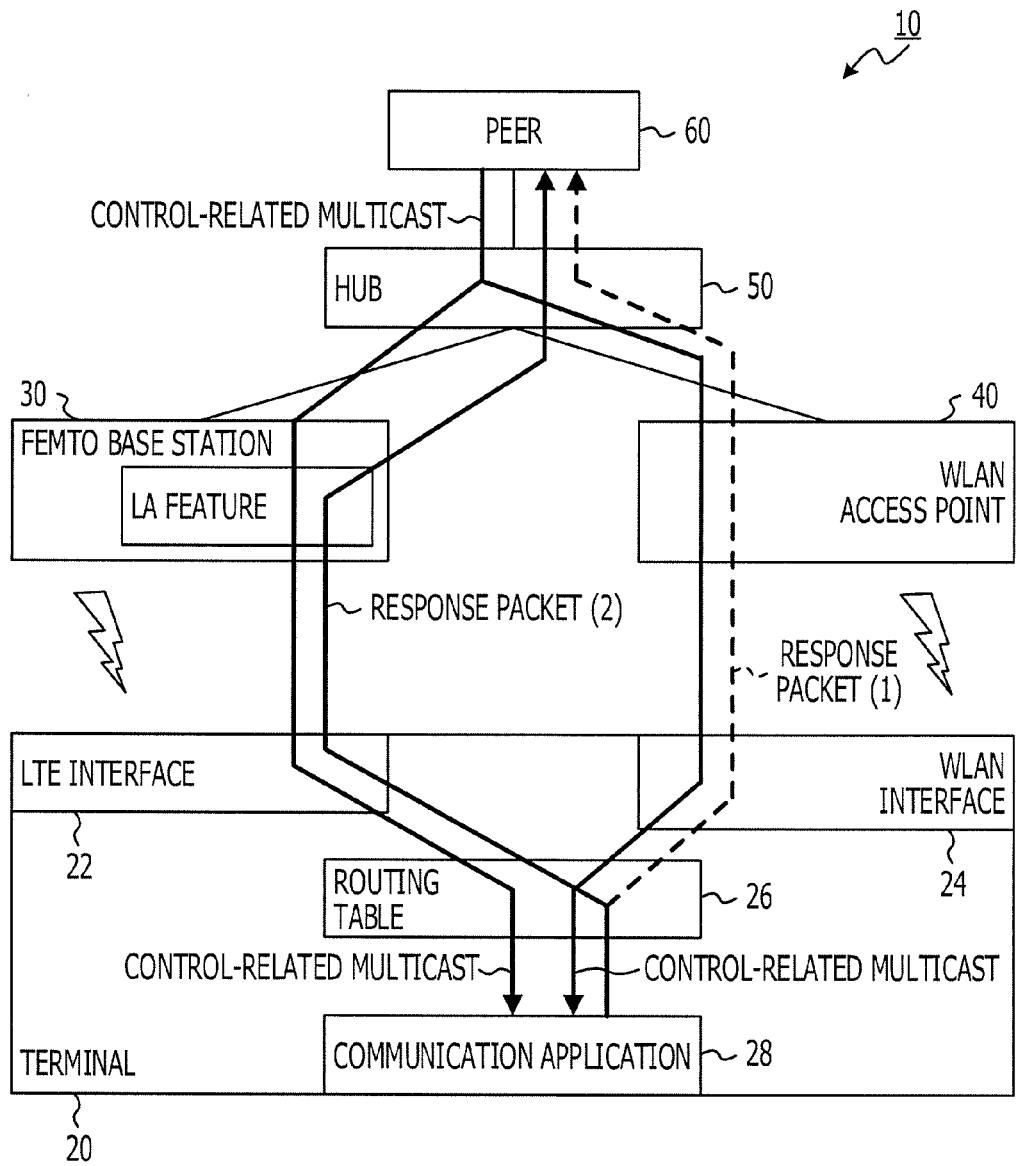
FIG. 4 illustrates an example of control-related multicast packet and broadcast packet routes.

FIG. 4 illustrates an example of control-related multicast packet and broadcast packet routes. FIG. 4 illustrates an example of routes for control-related multicast packets and broadcast packets transmitted from a peer 60 to a terminal 20 in a network similar to the home network in FIG. 1. The terminal 20 receives control-related multicast packets and broadcast packets via multiple interfaces, including an LTE interface 22 and a WLAN interface 24. According to the home network illustrated in FIG. 4, the terminal 20 may in some cases receive multicast packets after switching the LTE interface 22 from an idle state to a normal state.

Figure 5:
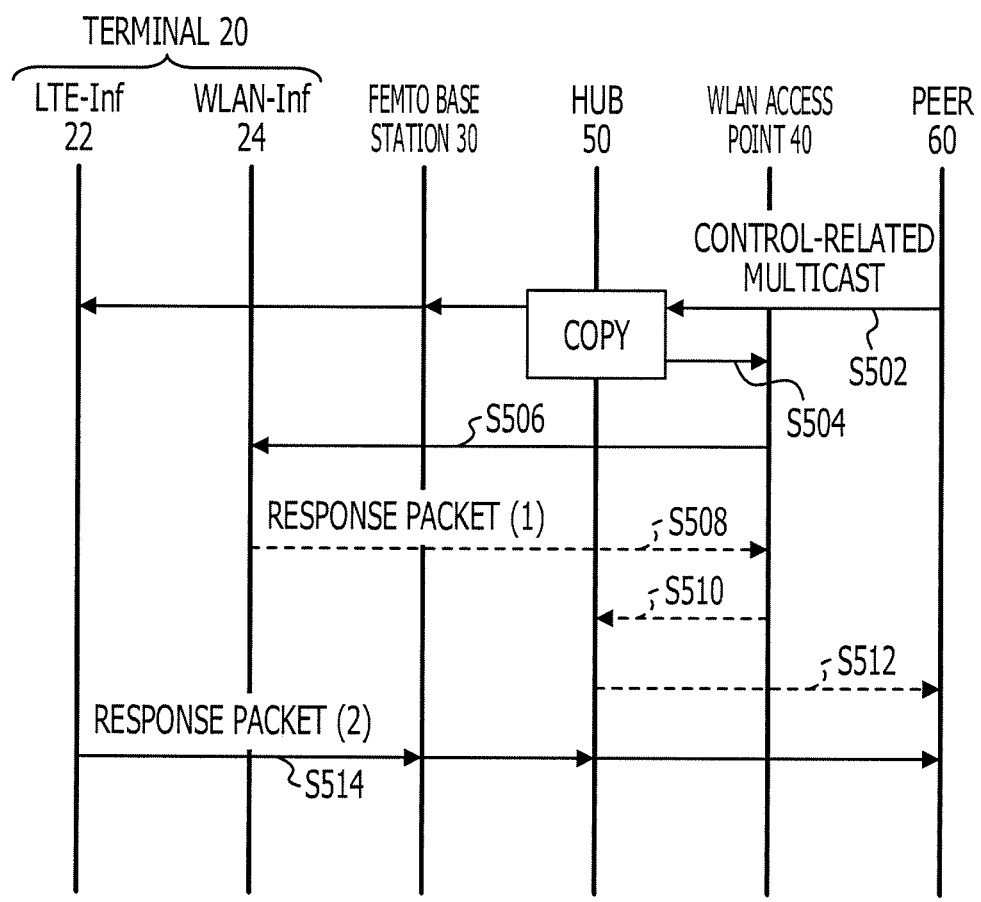
FIG. 5 is a sequence chart for transmitting control-related multicast packets.

FIG. 5 illustrates an example of a sequence for transmitting control-related multicast packets from the peer 60 to the terminal 20. Although control-related multicast packets are illustrated in FIG. 5, the concept is similar for broadcast packets.

In step S502, the peer 60 transmits a control-related multicast packet to the terminal 20. The control-related multicast packet is transmitted to the terminal 20 via the hub 50 and the femto base station 30.

In step S504, the hub 50 copies the control-related multicast packet from the peer 60. The hub 50 transmits the copied control-related multicast packet and broadcast packet to the WLAN access point 40.

In step S506, the WLAN access point 40 transmits the control-related multicast packet from the hub 50 to the terminal 20.

In step S508, the terminal 20 transmits a response packet to the peer 60. The response packet is transmitted to the WLAN access point 40.

In step S510, the WLAN access point 40 transmits the response packet that is from the terminal 20 to the hub 50.

In step S512, the hub 50 transmits the response packet that is from the WLAN access point 40 to the peer 60.

In step S514, the terminal 20 transmits a response packet to the peer 60. The response packet is transmitted to the peer 60 via the femto base station 30 and the hub 50.

As illustrated in FIG. 5, a terminal 20 receiving control-related multicast packets via multiple interfaces transmits response packets as a response to control-related multicast packets (control messages). When transmitting a response packet, the terminal 20 operates according to a communication application 28. Specifically, the terminal 20 transmits response packets according to routes set in a routing table 26.

For example, the terminal 20 transmits a response packet (1) from the WLAN interface 24, as illustrated in step S508 of FIG. 5. As another example, the terminal 20 transmits a response packet (2) from the LTE interface 22, as illustrated in step S514 of FIG. 5.

Route determination packets include the response packets (1) and (2). In other words, from the response packets (1) or (2) it is determined whether the flows after the response packets (1) or (2) will become a flow in which LA is usable (flow #1) or a flow in which LA is not usable (flow #2).

FIG. 6 illustrates an example of information indicating routes included in the routing table 26. According to the routing table 26 illustrated in FIG. 6, "Peer address" is specified as the destination, while "WLAN interface" is specified as the output interface. In this case, the terminal 20 references the routing table 26 and transmits the response packet (1) from the WLAN interface 24.

The control-related multicast may include a discovery message transmitted in order to discover devices when using the Universal Plug and Play (UPnP) protocol. In this case, a response packet may include a response message.

Also, the control-related multicast may include an IGMP Query message when using IGMP. In this case, response packets may include IGMP Join messages.

Figure 7:
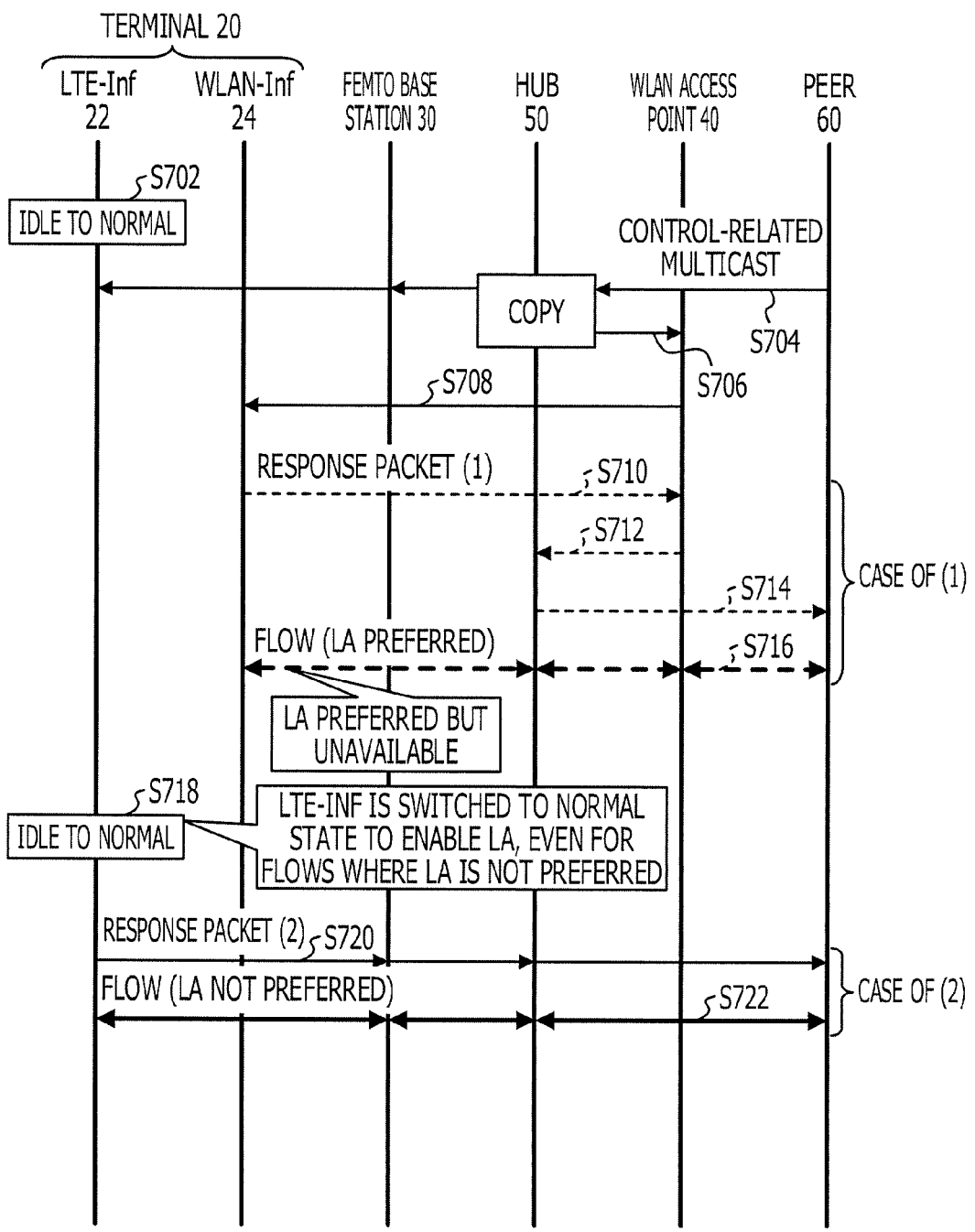
FIG. 7 is a sequence chart for receiving unicast or content-related multicast packets.

FIG. 7 illustrates an example of a sequence chart in which multicast packets are received, in a wireless communication system. The terminal 20 receives multicast packets after switching the LTE interface 22 from an idle state to a normal state. Although multicast packets are illustrated in FIG. 7, the concept is similar for broadcast packets.

In step S702, the terminal 20 switches the LTE interface 22 from an idle state to a normal state.

In step S704, the peer 60 transmits a control-related multicast packet to the terminal 20. The control-related multicast packet is transmitted to the terminal 20 via the hub 50 and the femto base station 30.

In step S706, the hub 50 copies the control-related multicast packet that is from the peer 60. The hub 50 transmits the copied control-related multicast packet to the terminal 20. The copied control-related multicast packet from the hub 50 is transmitted to the WLAN access point 40.

In step S708, the WLAN access point 40 transmits the control-related multicast packet from the hub 50 to the terminal 20.

The terminal 20 transmits a response packet according to the routing table 26. In other words, either the sequence illustrated by steps S710 to S716 or the sequence illustrated by steps S718 to S722 may be taken, depending on the destination and output interface specified by the routing table 26.

The case where the WLAN interface 24 is specified as the output interface by the routing table 26 (the case of (1)) will now be described.

In step S710, the terminal 20 transmits a response packet (1) to the peer 60. The response packet (1) is transmitted to the WLAN access point 40.

In step S712, the WLAN access point 40 forwards the response packet (1) that is from the terminal 20 to the hub 50.

In step S714, the hub 50 forwards the response packet (1) that is from the WLAN access point 40 to the peer 60.

In step S716, the peer 60 transmits a unicast packet or a content-related multicast packet to the terminal 20. The packet is transmitted to the terminal 20 via the hub 50 and the WLAN access point 40. The WLAN interface 24 of the terminal 20 receives the packet from the peer 60. The packet from the peer 60 may be part of a flow for which LA is preferred. However, since the response packet (1) (that is, the route determination packet) was transmitted from the WLAN interface 24, the route for packets following the response packet (1) becomes a route on which LA is unavailable.

The case where the LTE interface 22 is specified as the output interface by the routing table 26 (the case of (2)) will now be described.

In step S718, the terminal 20 switches the LTE interface 22 from an idle state to a normal state as appropriate.

In step S720, the terminal 20 transmits a response packet (2) to the peer 60. The response packet (2) is transmitted to the peer 60 via the femto base station 30 and the hub 50.

In step S722, the peer 60 transmits a unicast packet or a content-related multicast packet to the terminal 20. The packet is transmitted to the terminal 20 via the hub 50 and the femto base station 30. The LTE interface 22 of the terminal 20 receives the packet from the peer 60. The packet from the peer 60 may be part of a flow for which LA is not preferred. However, since the response packet (2) (that is, the route determination packet) was transmitted from the LTE interface 22, the route for packets following the response packet (2) becomes a route on which LA is available. In this case, it is preferable to not switch the LTE interface 22 from an idle state to a normal state, and not transmit the response packet (2) from the LTE interface 22.

According to the sequence chart illustrated in FIG. 7, a response packets route is controlled according to the routing table 26, irrespective of whether LA is preferred for the flow following the response packet. In other words, the terminal 20 may in some cases transmit a response packet from the WLAN interface 24 where LA is unavailable, even if LA is preferred for the subsequent flow. Specifically, in some cases the response packet (1) is transmitted from the WLAN interface 24 in accordance with the routing table 26 illustrated in FIG. 6. The LA feature will be unavailable for the flow following this response packet (1). In other words, in step S710, the terminal 20 transmits the response packet (1) from the WLAN interface 24. Accordingly, in step S716, the LA feature will be unavailable for the following flow for which LA is preferred.

In addition, the terminal 20 may in some cases transmit a response packet (2) from the LTE interface 22 for which LA is available, even if LA is not preferred for the subsequent flow. Specifically, in some cases the LTE interface 22 may be switched from an idle state to a normal state, and the response packet (2) may be transmitted from the LTE interface 22. In other words, in step S718, the terminal 20 causes the LTE interface 22, switches from an idle state to a normal state as appropriate. In step S720, the response packet (2) is transmitted from the LTE interface 22. Accordingly, although a subsequent flow is transmitted on a route where LA is available in step S722, LA is not preferred for the subsequent flow.

Hence, the terminal 20 conducts routing control for response packets in accordance with the routing table 26, irrespective of the state of the interface. Specifically, the routing of response packets is controlled in accordance with the routing table 26, irrespective of the power-saving state of the interface.

Consequently, in some cases the terminal 20 may receive multicast packets or transmit response packets corresponding to control-related multicast packets after causing an interface in a low-power state, switches to a normal state. Power is consumed when switching an interface in a low-power state to a normal state. From the perspective of reducing power consumption, switching the state of an interface is not preferable.

Thus, it is desirable for the wireless communication system according to the present disclosure to reduce power consumption.

First Embodiment

Wireless Communication System

Figure 8:
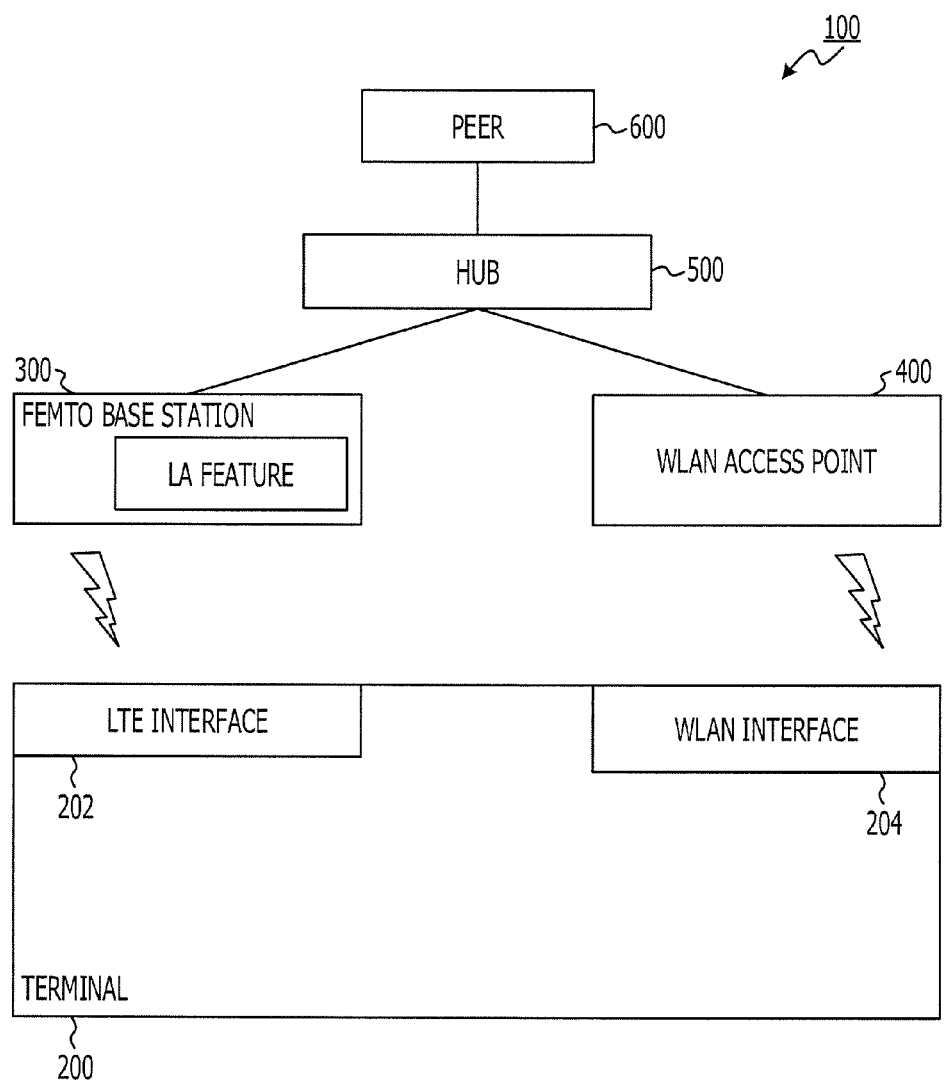
FIG. 8 illustrates a wireless communication system according to an embodiment.

FIG. 8 illustrates a wireless communication system 100 according to an embodiment.

A wireless communication system 100 according to an embodiment includes a terminal 200, a femto base station 300, a WLAN access point 400, a hub 500, and a peer 600.

The terminal 200 includes an LTE interface 202 and a WLAN interface 204. The LTE interface 202 wirelessly communicates with the femto base station 300 by using the LTE standard. The WLAN interface 204 wirelessly communicates with the WLAN access point 400 by using a WLAN technology. The terminal 200 may be any suitable apparatus enabling a user to communicate, including user terminals such as mobile phones, information terminals, personal digital assistants, portable personal computers, and smartphones, for example. However, the terminal 200 is not limited to the above.

The peer 600 represents a terminal that communicates with the terminal 200.

The network formed by the wireless communication system 100 may be a home network, for example, and is a single multicast or broadcast domain. In other words, multicast packets or broadcast packets transmitted by the terminal 200, which is coupled to the network, reach all other terminals coupled to the network. In the example of a network illustrated in FIG. 8, multicast or broadcast packets transmitted by the peer 600 arrive at the LTE interface 202 and the WLAN interface 204 of the terminal 200.

However, multicast packets may not reach the interfaces of all other terminals coupled to the network when the IGMP snooping feature is enabled in the hub 500. When requesting content-related multicast packets such as video, the terminal 200 transmits a message for joining a multicast group to the multicast address. The hub 500 transmits content-related multicast packets, such as video, to a port where a multicast group join message has been received.

For example, the terminal 200 may transmit an IGMP Join message, which relates to a given multicast address, from the WLAN interface 204. The hub 500 transmits content-related multicast packets corresponding to that multicast address to the port that couples to that WLAN interface 204.

Consequently, the flow of content-related multicast packets corresponding to the multicast address becomes like a unicast flow between the WLAN access point 400 and the WLAN interface 204 of the terminal 200. Meanwhile, control-related multicast packets are copied in the hub 500 and reach the interface of each terminal coupled to the network.

As another example, the terminal 200 may transmit an IGMP Join message for a given multicast address from the LTE interface 202. The hub 500 transmits content-related multicast packets corresponding to that multicast address to the port that couples to that LTE interface 202.

Consequently, the flow of content-related multicast packets corresponding to the multicast address becomes like a unicast flow between the femto base station 300 and the LTE interface 202 of the terminal 200. Meanwhile, control-related multicast packets are copied in the hub 500 and reach the interface of each terminal coupled to the network.

The femto base station 300 provides an LA feature on the network. When the LA feature is provided, LTE links and WLAN links are simultaneously used for flows such as traffic flows. Using the LA feature enables improved throughput. The WLAN access point 400 may be configured to also provide the LA feature. In this case, when the LA feature is provided, LTE links and WLAN links are simultaneously used for flows such as traffic flows.

Femto Base Station 300

Figure 9:
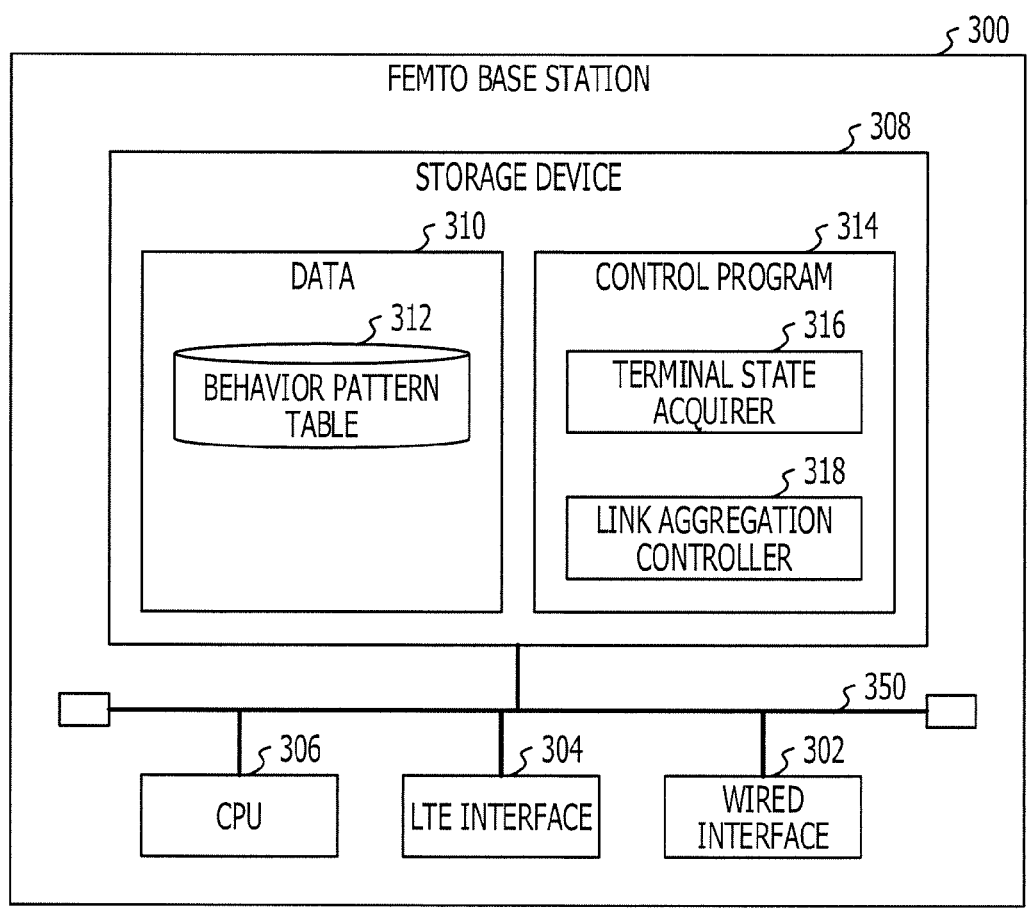
FIG. 9 illustrates a femto base station according to an embodiment.

FIG. 9 illustrates a femto base station 300 according to an embodiment. A femto base station 300 according to an embodiment will be described for when an LTE interface that conducts wireless communication by using the LTE standard is included. However, the femto base station 300 may be configured to include an interface that conducts wireless communication by another wireless communication technology.

The femto base station 300 includes a wired interface 302, an LTE interface 304, a central processing unit (CPU) 306, and a storage device 308. The wired interface 302, the LTE interface 304, the CPU 306, and the storage device 308 are coupled by a bus 350.

The storage device 308 stores data 310 and a control program 314. The data 310 includes a behavior pattern table 312. The control program 314 includes a program that causes the CPU 306 to function as a terminal state acquirer 316 and a program that causes the CPU 306 to function as a link aggregation controller 318. These programs may be provided in prerecorded state on a recording medium such as a floppy disk, CD-ROM, or memory card, for example, but may also be provided by being made downloadable via a communication network.

Operation as the femto base station 300 is achieved by the CPU 306 operating in accordance with the control program 314. In other words, by operating in accordance with the control program 314, the CPU 306 functions as the terminal state acquirer 316. The terminal state acquirer 316 acquires information that expresses the state of each interface included in the terminal 200. In addition, by operating in accordance with the control program 314, the CPU 306 functions as the link aggregation controller 318. The link aggregation controller 318 applies control so as to transmit multicast packets, broadcast packets, or unicast packets to the terminal 200 using LA.

The wired interface 302 transmits and receives data to and from the hub 500. The wired interface 302 and the hub 500 may be coupled by optical fiber, for example.

The LTE interface 304 wirelessly communicates with the terminal 200 by using the LTE standard.

By operating in accordance with the control program 314, the CPU 306 controls the wired interface 302, the LTE interface 304, and the storage device 308.

Terminal 200

Figure 10:
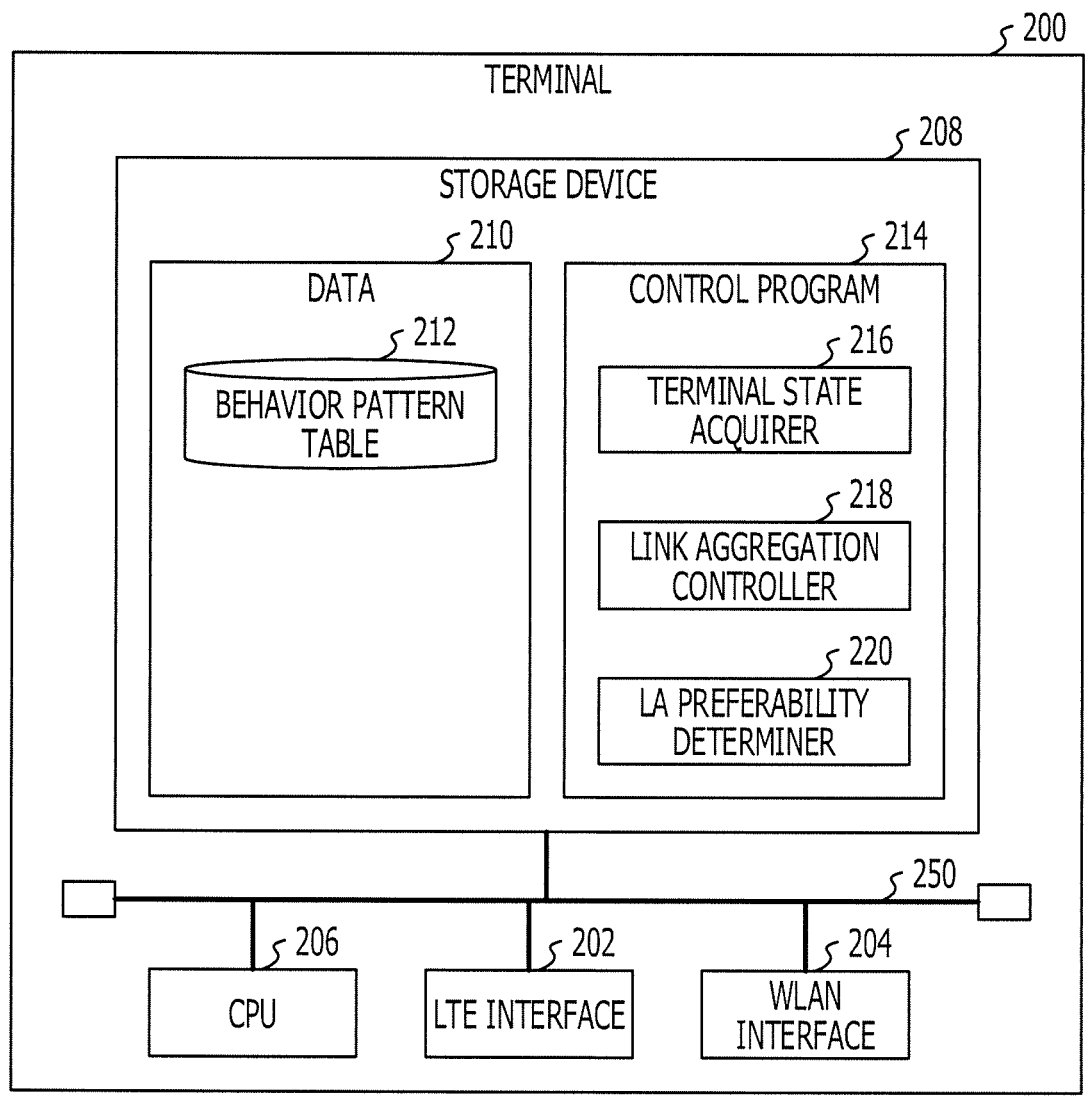
FIG. 10 illustrates a terminal according to an embodiment.

FIG. 10 illustrates a terminal 200 according to an embodiment. A terminal 200 according to an embodiment will be described for when an LTE interface 202 that conducts wireless communication according to the LTE standard and a WLAN interface 204 are included. However, the terminal 200 may be configured to include multiple interfaces that conduct wireless communication by using other wireless communication technologies.

The terminal 200 includes an LTE interface 202, a WLAN interface 204, a CPU 206, and storage device 208. The LTE interface 202, the WLAN interface 204, the CPU 206, and the storage device 208 are coupled by a bus 250.

The storage device 208 stores data 210 and a control program 214. The data 210 includes a behavior pattern table 212. The control program 214 includes a program that causes the CPU 206 to function as a terminal state acquirer 216, a program that causes the CPU 206 to function as a link aggregation controller 218, and a program that causes the CPU 206 to function as an LA preferability determiner 220. These programs may be provided in prerecorded state on a recording medium such as a floppy disk, CD-ROM, or memory card, for example, but may also be provided by being made downloadable via a communication network.

Operation as the terminal 200 is achieved by the CPU 206 operating in accordance with the control program 214. In other words, by operating in accordance with the control program 214, the CPU 206 functions as the terminal state acquirer 216. The terminal state acquirer 216 acquires information indicating the state of each interface included in the terminal 200. In addition, by operating in accordance with the control program 214, the CPU 206 functions as the link aggregation controller 218. The link aggregation controller 218 applies control to receive multicast packets, broadcast packets, or unicast packets that are transmitted by the femto base station 300 using the LA feature. Also, by operating in accordance with the control program 214, the CPU 206 functions as the LA preferability determiner 220. The LA preferability determiner 220 determines whether LA is preferred for a subsequent flow for a response packet for a multicast packet or broadcast packet transmitted by the femto base station 300.

The LTE interface 202 wirelessly communicates with the femto base station 300 by using the LTE standard.

The WLAN interface 204 wirelessly communicates with the WLAN access point 400 by using a WLAN technology.

By operating in accordance with the control program 214, the CPU 206 controls the LTE interface 202, the WLAN interface 204, and the storage device 208.

Operation of Femto Base Station 300

Figure 11:
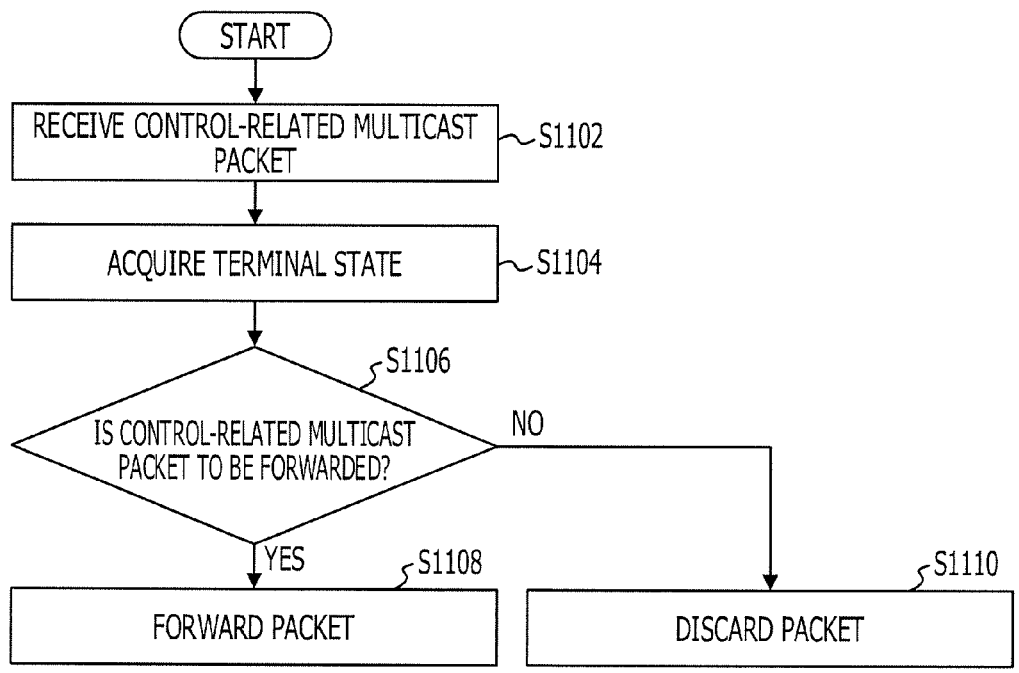
FIG. 11 is a flowchart illustrating operation of a femto base station according to an embodiment.

FIG. 11 illustrates operation of a femto base station 300 according to an embodiment. Although control-related multicast packets are illustrated in FIG. 11 as an example, the concept is similar for broadcast packets.

In step S1102, the wired interface 302 of the femto base station 300 receives a control-related multicast packet from the hub 500, for example.

In step S1104, the CPU 306, functioning as the terminal state acquirer 316, acquires information indicating the state of the LTE interface 202 and information indicating the state of the WLAN interface 204 in the terminal 200. Specifically, the CPU 306, functioning as the terminal state acquirer 316, acquires information that expresses the state of each interface in the terminal 200 from a control message from the terminal 200. Which interface in the terminal 200 transmits the control message depends on the state of each interface in the terminal 200. For example, the terminal 200 transmits a control message from the WLAN interface 204 when the LTE interface 202 is in an idle state. Conversely, the terminal 200 transmits a control message from the LTE interface 202 when the link is down for the WLAN interface 204 (hereinafter referred to as the "link-down state"). The terminal 200 transmits a control message from a preset interface when the LTE interface 202 is in an idle state and the WLAN interface 204 is in a link-down state. The control message includes information indicating the state of the LTE interface 202 as well as information indicating the state of the WLAN interface 204, irrespective of the transmitting interface.

The CPU 306, functioning as the terminal state acquirer 316, may be configured to periodically acquire information that expresses the state of each interface in the terminal 200. By periodically acquiring information that expresses the state of each interface in the terminal 200, the processing in step S1104 may be omitted. This is because already acquired information may be used instead of acquiring the state of each interface in the terminal 200 in step S1104.

In step S1106, the CPU 306, functioning as the link aggregation controller 318, determines whether to forward the control-related multicast packet to the terminal 200. The CPU 306, functioning as the link aggregation controller 318, references the behavior pattern table and determines whether to forward the control-related multicast packet that was received in step S1102 to the terminal 200.

FIG. 12 illustrates a behavior pattern table according to an embodiment.

The behavior pattern table illustrated in FIG. 12 associates together information that indicates packet types, information that indicates the state of the LTE interface 202, information that indicates the state of the WLAN interface 204, and LA-related behaviors. "DC" means "Don't Care".

The LTE interface 202 has a normal state and an idle state. Power is consumed when switching from the idle state to the normal state (hereinafter referred to as the "switching power").

The WLAN interface 204 has a normal state, a "PS (Power Saving) with Receive DTIM variable=0" state (hereinafter referred to as the "PS state"), and a link-down state.

In the PS state, the WLAN interface 204 is able, establishes a wireless connection with the WLAN access point 400, but is unable to receive multicast packets.

In the link-down state, the WLAN interface 204 has not established a wireless connection with the WLAN access point 400. The reason for not establishing a wireless connection may be because of a setting in the terminal 200 or because radio waves from the WLAN access point 400 are not reaching the WLAN interface 204.

When a wireless connection is not established because of a setting, the terminal 200 is still able to establish a wireless connection with the WLAN access point 400. However, switching power is also consumed, similarly to when the LTE interface 202 switches from an idle state to a normal state.

In addition, the femto base station 300 may not be able to instruct the terminal 200 to establish a WLAN connection.

The behavior pattern table illustrated in FIG. 12 indicates how to process a control-related multicast packet according to the state of the WLAN interface 204. Broadcast packets are also processed as illustrated in FIG. 12. In the example illustrated in FIG. 12, the state of the LTE interface 202 is not considered. Specifically, the instruction is to discard a control-related multicast packet when the WLAN interface 204 is receiving packets, and to forward the control-related multicast packet when the WLAN interface 204 is not receiving packets.

With No. 1, the CPU 306, functioning as the link aggregation controller 318 of the femto base station 300, applies control so as to discard the control-related multicast packet when the WLAN interface 204 is in a normal state. By applying control such that the control-related multicast packet is discarded by the femto base station 300, the LTE interface 202 of the terminal 200 is not made to needlessly switch to a normal state, even if the LTE interface 202 happens to be in an idle state. Since the LTE interface 202 of the terminal 200 is not made to needlessly switch to a normal state, switching power is not needlessly consumed.

With No. 2, the CPU 306, functioning as the link aggregation controller 318 of the femto base station 300, applies control so as to forward the control-related multicast packet when the WLAN interface 204 is in a PS state or a link-down state. This is done because the control-related multicast packet may not be received by the WLAN interface 204 of the terminal 200. By applying control such that the control-related multicast packet is forwarded by the femto base station 300, the LTE interface 202 of the terminal 200 may be made to switch to a normal state and thereby receive the control-related multicast packet, even if the LTE interface 202 happens to be in an idle state. Although switching power is consumed when the LTE interface 202 of the terminal 200 switches to the normal state, the terminal 200 likely does not fail to receive the control-related multicast packet.

By specifying whether to discard or forward according to whether a control-related multicast packet can be received by the WLAN interface 204, it may be possible to reduce the number of times the LTE interface 202 changes state. Specifically, it may be possible to reduce the number of times the LTE interface 202 is switched to a normal state.

When it is determined in step S1106 that the control-related multicast packet is to be forwarded, in step S1108 the CPU 306, functioning as the link aggregation controller 318, forwards the control-related multicast packet. When the control-related multicast packet has been forwarded, the LTE interface 202 of the terminal 200 receives the control-related multicast packet.

When it is determined in step S1106 that the control-related multicast packet is to be discarded, in step S1110 the CPU 306, functioning as the link aggregation controller 318, discards the control-related multicast packet. When the control-related multicast packet is discarded, the WLAN interface 204 of the terminal 200 receives the control-related multicast packet.

Operation of Terminal 200

Figure 13:
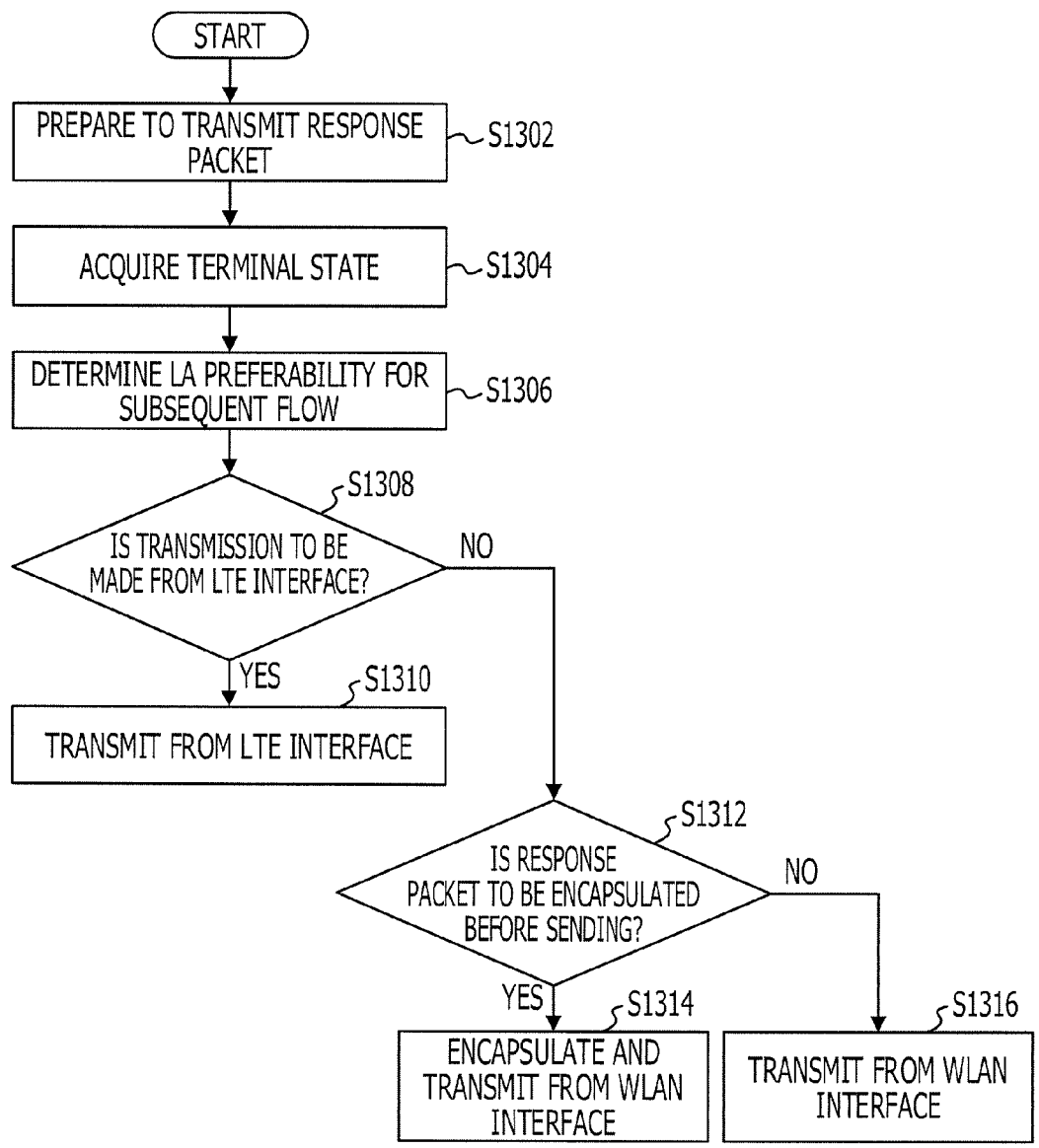
FIG. 13 is a flowchart illustrating operation of a terminal according to an embodiment.

FIG. 13 illustrates operation of a terminal 200 according to an embodiment.

In step S1302, the CPU 206, functioning as the link aggregation controller 218, prepares to transmit a response packet.

In step S1304, the CPU 206, functioning as the terminal state acquirer 216, acquires the state of the LTE interface 202 and the state of the WLAN interface 204.

In step S1306, the CPU 206, functioning as the LA preferability determiner 220, determines whether LA is preferred for the flow that will follow the response packet for the control-related multicast packet. Specifically, the CPU 206, functioning as the LA preferability determiner 220, may be configured to determine whether LA is preferred based on the protocol of the flow that will follow the response packet for the control-related multicast packet. For example, the CPU 206, functioning as the LA preferability determiner 220, may determine that LA is preferred for a high-throughput protocol such as a video-related flow.

Additionally, when the response packet for the control-related multicast packet is a flow start packet for a unicast flow, the CPU 206, functioning as the LA preferability determiner 220, may be configured to determine whether the data attempted to be acquired with the unicast flow is video-related, and thereby determine whether LA is preferred.

Furthermore, when the response packet, or in other words the route determination packet, is an IGMP Join message, the CPU 206, functioning as the LA preferability determiner 220, may be configured to determine whether LA is preferred based on the multicast address that is to be joined. This is because it may be determined whether a flow is video-related according to the multicast address that is to be joined.

In step S1308, the CPU 206, functioning as the link aggregation controller 218, determines whether to transmit a response packet from the LTE interface 202. Specifically, the CPU 206, functioning as the link aggregation controller 218, references the behavior pattern table 212 and determines the interface from which to transmit a response packet.

The CPU 206, functioning as the link aggregation controller 218, references the behavior pattern table 212. The CPU 206, functioning as the link aggregation controller 218, acquires information that expresses the state of each interface from the CPU 206, which is functioning as the terminal state acquirer 216. In addition, the CPU 206, functioning as the link aggregation controller 218, acquires information that expresses whether LA is preferred for the subsequent flow from the CPU 206, which is functioning as the LA preferability determiner 220. The CPU 206, functioning as the link aggregation controller 218, determines the interface from which to transmit a response packet based on the information that expresses the state of each interface and the information that indicating whether LA is preferred for the subsequent flow.

FIG. 14 illustrates a behavior pattern table 212 according to an embodiment.

The behavior pattern table 212 illustrated in FIG. 14 associates together information that indicates packet types, information that indicates the state of the LTE interface 202, information that indicates the state of the WLAN interface 204, and information that indicates whether LA is preferred for the subsequent flow. Additionally, the behavior pattern table 212 illustrated in FIG. 14 associates together operational policies and LA-related behaviors. "DC" means "Don't Care". The behavior pattern table 212 illustrated in FIG. 14 indicates how to process a response packet (that is, a route determination packet).

No. 3 corresponds to when the LTE interface 202 is in a normal state, and LA is preferred for the subsequent flow. In this case, the CPU 206, functioning as the link aggregation controller 218 of the terminal 200, applies control so as to transmit a response packet from the LTE interface 202. Applying control so as to transmit a response packet from the LTE interface 202 enables the use of LA for the subsequent flow.

No. 4 corresponds to when the LTE interface 202 is in an idle state, and LA is preferred for the subsequent flow. In this case, the CPU 206, functioning as the link aggregation controller 218 of the terminal 200, applies control so as to transmit a response packet according to the operational policy setting. Specifically, the CPU 206, functioning as the link aggregation controller 218 of the terminal 200, applies control so as to encapsulate a response packet with the address of the femto base station 300 and transmit the result from the WLAN interface 204. When the WLAN interface 204 is in a link-down state, the CPU 206, functioning as the link aggregation controller 218 of the terminal 200, applies control so as to transmit the encapsulated packet after first establishing a link with the WLAN interface 204. The femto base station 300 may possibly not be able to directly establish a link to the WLAN interface 204 of the terminal 200. However, the terminal 200 is able, establishes a link with its own WLAN interface 204.

Encapsulating the response packet increases the packet length and incurs overhead. However, by transmitting from the WLAN interface 204, switching power, switches the LTE interface 202 to a normal state is not consumed. Accordingly, transmitting an encapsulated response packet from the WLAN interface 204 is preferable from the perspective of power saving. Additionally, although power is consumed when establishing a link with the WLAN interface 204, it is anticipated that the power expenditure will be less than power used, switches to the LTE interface 202.

Meanwhile, it is also anticipated that a wireless connection may not be established even if the CPU 206, functioning as the link aggregation controller 218 of the terminal 200, attempts, establishes a link with the WLAN interface 204, because radio waves from the WLAN access point 400 are not reaching the WLAN interface 204. In this case, the CPU 206, functioning as the link aggregation controller 218 of the terminal 200, may be configured, switches the LTE interface 202 to a normal state. In this case, the CPU 206, functioning as the link aggregation controller 218 of the terminal 200, applies control to transmit a response packet from the LTE interface 202.

No. 5 corresponds to when the LTE interface 202 is in an idle state, and LA is preferred for the subsequent flow. In this case, the CPU 206, functioning as the link aggregation controller 218 of the terminal 200, applies control so as to transmit a response packet according to the operational policy setting. Specifically, the CPU 206, functioning as the link aggregation controller 218 of the terminal 200, applies control so as to transmit a response packet from the LTE interface 202.

In this case, switching power is consumed when switching the LTE interface 202 from an idle state to a normal state. However, since LA is preferred for the subsequent flow the response packet, it is not problematic, switches the LTE interface 202 from an idle state to a normal state and transmit the response packet.

The question of whether to operate according to No. 4 or No. 5 depends on the operational policy. In other words, operation obeys the operational policy settings.

No. 6 corresponds to when the LTE interface 202 is in an idle state, and it is determined that LA is not preferred for the subsequent flow. In this case, the CPU 206, functioning as the link aggregation controller 218 of the terminal 200, applies control to transmit a response packet from the WLAN interface 204. When the WLAN interface 204 is in a link-down state, the CPU 206, functioning as the link aggregation controller 218 of the terminal 200, transmits the response packet after first establishing a link with the WLAN interface 204.

Although power is consumed when establishing a link with the WLAN interface 204, it is anticipated that the power expenditure will be less than the switching power of the LTE interface 202.

Meanwhile, it is also anticipated that a wireless connection may not be established even if the CPU 206 functions as the link aggregation controller 218 of the terminal 200 because radio waves from the WLAN access point 400 are not reaching the WLAN interface 204. In this case, the CPU 206, functioning as the link aggregation controller 218 of the terminal 200, may be configured to switch the LTE interface 202 to a normal state. In this case, the CPU 206, functioning as the link aggregation controller 218 of the terminal 200, applies control to transmit a response packet from the LTE interface 202. In so doing, needless consumption of switching power for the LTE interface 202 may be avoided for flows where LA is not preferred.

No. 7 corresponds to when the LTE interface 202 is in a normal state, the WLAN interface 204 is in a link-down state, and it is determined that LA is not preferred for the subsequent flow. In this case, the CPU 206, functioning as the link aggregation controller 218 of the terminal 200, applies control so as to transmit a response packet from the LTE interface 202. Since LA is not preferred for the subsequent flow, it is not preferable to transmit a response packet from the LTE interface 202. However, since the WLAN interface 204 is in a link-down state, a response packet is transmitted from the LTE interface 202 in order to save power. In so doing, power consumed to establish a link with the WLAN interface 204 may be saved.

No. 8 corresponds to when the LTE interface 202 is in a normal state, the WLAN interface 204 is in a normal state, and it is determined that LA is not preferred for the subsequent flow. In this case, the CPU 206, functioning as the link aggregation controller 218 of the terminal 200, applies control to transmit a response packet from the WLAN interface 204. Since LA is not preferred for the subsequent flow, control is applied to transmit a response packet from the WLAN interface 204. Since both interfaces are in a normal state, switching power is not consumed when transmitting a response packet. By applying control to transmit a response packet from the WLAN interface 204, packets are not transmitted from the LTE interface 202. Since packets are not transmitted from the LTE interface 202, the LTE interface 202 is able to switch to an idle state sooner. Since the LTE interface 202 is able to switch to an idle state sooner, power may be saved.

When it is determined in step S1308 that a response packet is to be transmitted from the LTE interface 202, in step S1310 the CPU 206, functioning as the link aggregation controller 218, applies control to transmit the response packet from the LTE interface 202.

When it is determined in step S1308 that a response packet is not to be transmitted from the LTE interface 202, in step S1312 the CPU 206, functioning as the link aggregation controller 218, determines whether to encapsulate the response packet and send the encapsulated response packet.

When it is determined in step S1312 that the response packet is to be encapsulated and then sent, in step S1314 the CPU 206, functioning as the link aggregation controller 218, applies control so as to encapsulate the response packet and transmit the result from the WLAN interface 204.

When it is determined in step S1312 that the response packet is to be transmitted without encapsulation, in step S1316 the CPU 206, functioning as the link aggregation controller 218, applies control to transmit the response packet from the WLAN interface 204.

Operation of Wireless Communication System 100 (1)

Figure 15:
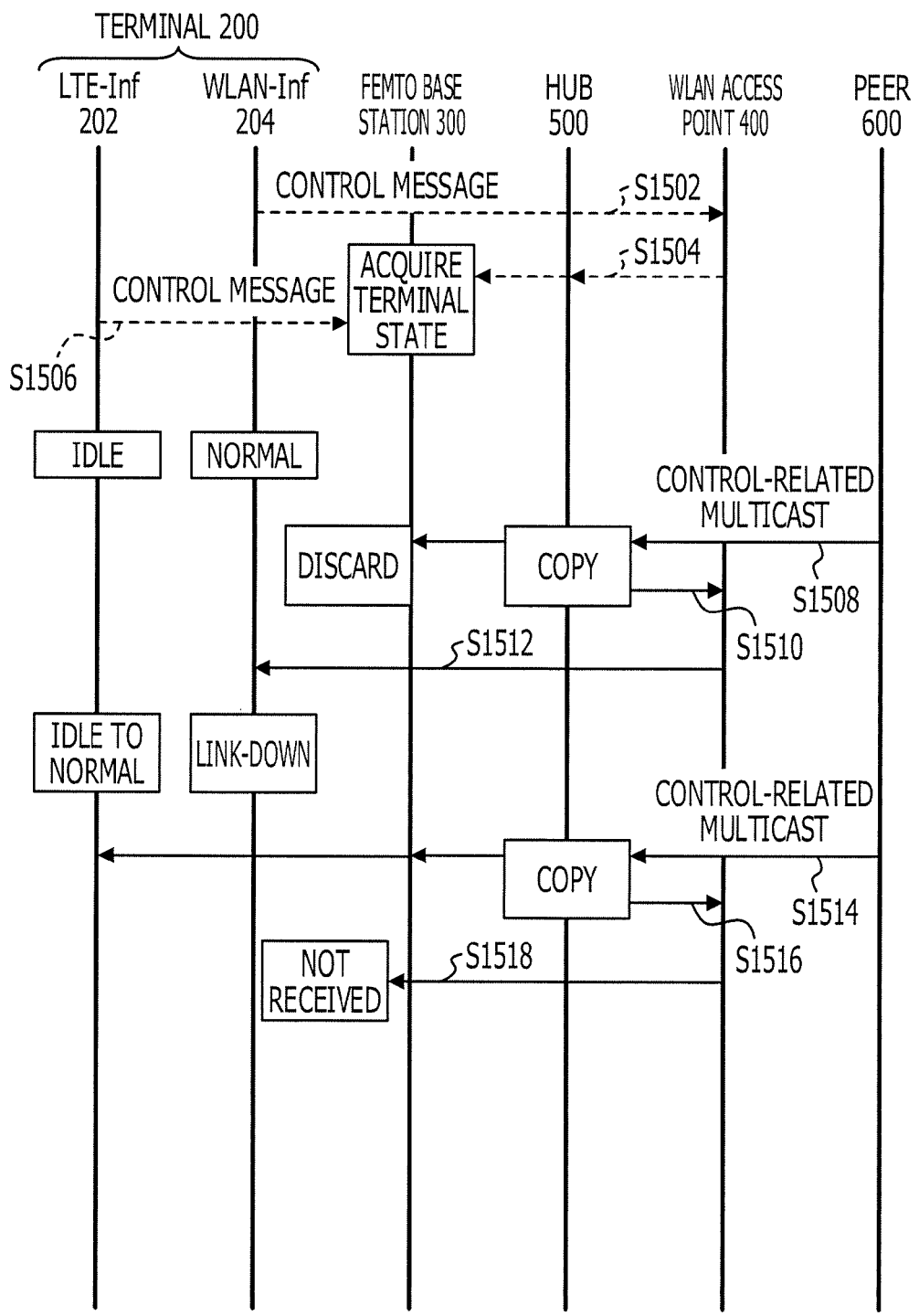
FIG. 15 is a sequence chart illustrating operation of a wireless communication system according to an embodiment.

FIG. 15 illustrates operation of a wireless communication system 100 according to an embodiment. Although control-related multicast messages are illustrated in FIG. 15 as an example, the concept is similar for broadcast messages.

In step S1502, the WLAN interface 204 transmits a control message to the femto base station 300. The control message contains information indicating the state of an interface in the terminal 200. The control message from the terminal 200 is transmitted to the WLAN access point 400.

In step S1504, the WLAN access point 400 transmits the control message from the terminal 200 to the femto base station 300. The femto base station 300 acquires the information indicating the state of an interface, information which is contained in the control message from the terminal 200.

In step S1506, the LTE interface 202 transmits a control message to the femto base station 300. The control message contains information indicating the state of an interface in the terminal 200. The femto base station 300 acquires the information indicating the state of an interface, information which is contained in the control message from the terminal 200.

The case where the LTE interface 202 of the terminal 200 is in an idle state and the WLAN interface 204 is in a normal state will now be described.

In step S1508, a control-related multicast packet from the peer 600 is transmitted to the femto base station 300 via the hub 500. The femto base station 300, following the behavior pattern table 312 illustrated in FIG. 12, discards the control-related multicast packet from the hub 500.

In step S1510, the hub 500 copies the control-related multicast packet from the peer 600. The hub 500 transmits the copied control-related multicast packet to the terminal 200. The control-related multicast packet copied by the hub 500 is transmitted to the WLAN access point 400.

In step S1512, the WLAN access point 400 transmits the control-related multicast packet from the hub 500 to the terminal 200. The control-related multicast packet from the WLAN access point 400 is received by the WLAN interface 204 of the terminal 200.

The case where the WLAN interface 204 of the terminal 200 is in a link-down state will now be described.

In step S1514, a control-related multicast packet from the peer 600 is transmitted to the femto base station 300 via the hub 500. The femto base station 300 transmits the control-related multicast packet from the hub 500 to the terminal 200. The LTE interface 202 of the terminal 200 receives the control-related multicast packet from the femto base station 300. In this case, the terminal 200 switches the LTE interface 202 to a normal state when the LTE interface 202 is in an idle state.

In step S1516, the hub 500 copies the control-related multicast packet from the peer 600. The hub 500 transmits the copied control-related multicast packet to the terminal 200. The control-related multicast packet copied by the hub 500 is transmitted to the WLAN access point 400.

In step S1518, the WLAN access point 400 transmits the control-related multicast packet from the hub 500 to the terminal 200. Since the WLAN interface 204 of the terminal 200 is in a link-down state, the control-related multicast packet from the WLAN access point 400 is not received.

Operation of Wireless Communication System 100 (2)

Figure 16:
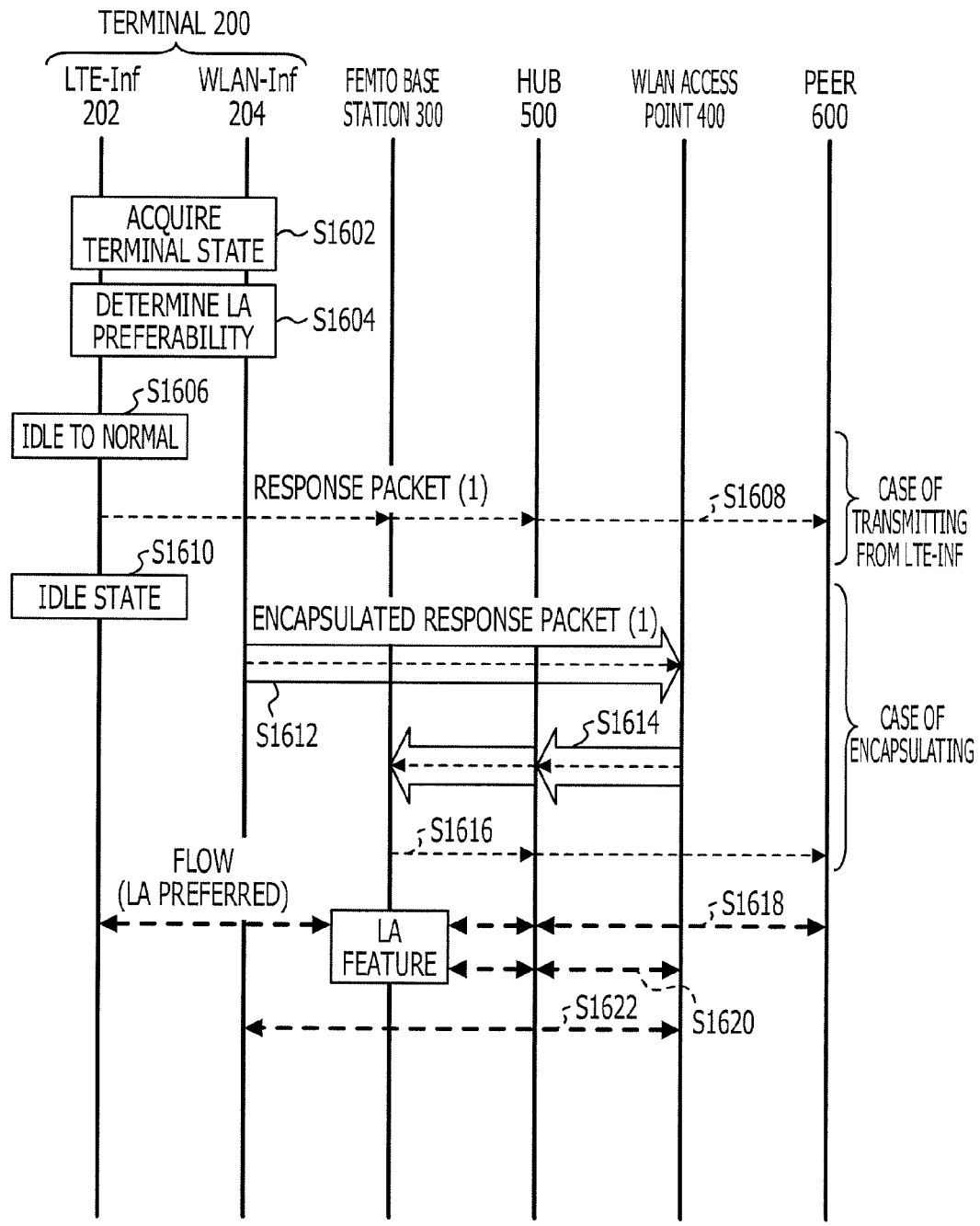
FIG. 16 is a sequence chart illustrating operation of a wireless communication system according to an embodiment.

FIG. 16 illustrates operation of a wireless communication system 100 according to an embodiment.

In step S1602, the CPU 206, functioning as the terminal state acquirer 216, acquires the state of the LTE interface 202 and the state of the WLAN interface 204.

In step S1604, the CPU 206, functioning as the LA preferability determiner 220, determines whether LA is preferred for the flow that will follow a response packet.

The case where LA is preferred for the subsequent flow and a response packet is transmitted from the LTE interface 202 will now be described.

In step S1606, the CPU 206, functioning as the link aggregation controller 218, switches the LTE interface 202 to a normal state as appropriate.

In step S1608, the LTE interface 202 transmits a response packet.

Specifically, both the case where it is determined that the LTE interface 202 is in a normal state and that LA is preferred for the subsequent flow (No. 3), and the case where it is determined that the LTE interface 202 is in an idle state and that LA is preferred for the subsequent flow (No. 5) apply at this point. In addition, the case where the LTE interface 202 is in a normal state and the WLAN interface 204 is in a link-down state (No. 7) also applies even when it is determined that LA is not preferred.

The response packet transmitted from the LTE interface 202 of the terminal 200 is transmitted to the peer 600 via the femto base station 300 and the hub 500.

The case where LA is preferred for the subsequent flow and a response packet is encapsulated with the address of the femto base station 300 and transmitted from the WLAN interface 204 will now be described.

The LTE interface 202 is in an idle state (step S1610).

In step S1612, the WLAN interface 204 encapsulates and transmits a response packet (1) encapsulated with the address of the femto base station 300. Specifically, the case where it is determined that the LTE interface 202 is in an idle state and LA is preferred for the subsequent flow (No. 4) applies at this point. The WLAN interface 204 encapsulates a response packet whose source is the LTE interface 202 and whose destination is the peer 600 with a delivery header indicating the WLAN interface 204 as the source and the femto base station 300 as the destination. The response packet from the terminal 200 is transmitted to the WLAN access point 400.

In step S1614, the WLAN access point 400 forwards the response packet, which is transmitted from the WLAN interface 204 of the terminal 200, to the hub 500. The hub 500 forwards the response packet from the WLAN access point 400 to the femto base station 300.

In step S1616, the femto base station 300 forwards the response packet from the hub 500 to the peer 600. The femto base station 300 decapsulates the response packet from the hub 500 and transmits the decapsulated packet to the peer 600. The decapsulated response packet from the femto base station 300 is forwarded to the peer 600 via the hub 500.

In step S1618, the peer 600 transmits the subsequent flow for the response packet which was received in step S1608 to the LTE interface 202. The subsequent flow for the response packet is transmitted to the terminal 200 via the femto base station 300. The LTE interface 202 of the terminal 200 receives the flow from the femto base station 300.

Alternatively, the peer 600 transmits the subsequent flow for the response packet which was decapsulated in step S1616 to the LTE interface 202. This is because the source of the decapsulated response packet is the LTE interface 202. The peer 600 thus interprets the response packet as having been transmitted from the LTE interface 202.

The subsequent flow the response packet is transmitted to the terminal 200 by the femto base station 300 using LA. The LTE interface 202 of the terminal 200 receives the flow from the femto base station 300.

In step S1620, the CPU 306, functioning as the link aggregation controller 318, applies control to use LA on the subsequent flow for the response packet. Specifically, the CPU 306, functioning as the link aggregation controller 318, applies control to enable LA with respect to the WLAN access point 400.

In step S1622, the WLAN access point 400 transmits the subsequent flow for the response packet to the terminal 200.

Packets included in the subsequent flow from the femto base station 300 may contain information that differs from packets included in the subsequent flow from the WLAN access point 400. For example, the femto base station 300 and the WLAN access point 400 may be configured to sequentially transmit packets that are included in the subsequent flow.

In steps S1618 to S1622, the CPU 306, functioning as the link aggregation controller 318 of the femto base station 300, may also use an LTE link and a WLAN link without using LA on the flow.

Additionally, the CPU 306, functioning as the link aggregation controller 318 of the femto base station 300, may be configured to apply control to forward the flow based on moment-to-moment changes in congestion conditions on each link, for example. Specifically, the CPU 306, functioning as the link aggregation controller 318 of the femto base station 300, may be configured to apply control to forward the flow using either or both an LTE link and a WLAN link. LA is compatible with the case of forwarding the flow by simultaneously using both an LTE link and a WLAN link.

Depending on the power-saving states of interfaces for the terminal 200 and whether LA is preferred, the terminal 200 transmits a response packet from the LTE interface 202 or transmits an encapsulated response packet from the WLAN interface 204. In so doing, the terminal 200 is able to receive the transmitted subsequent flows using LA where appropriate.

Operation of Wireless Communication System 100 (3)

Figure 17:
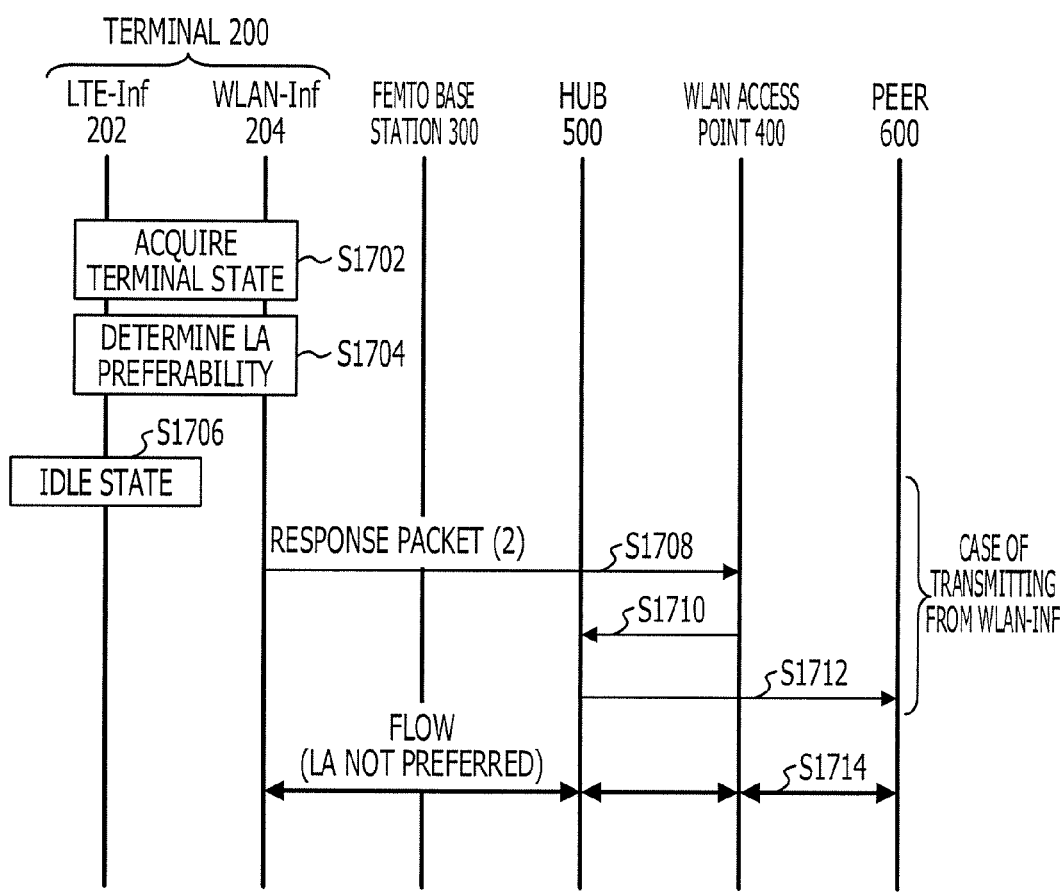
FIG. 17 is a sequence chart illustrating operation of a wireless communication system according to an embodiment.

FIG. 17 illustrates operation of a wireless communication system 100 according to an embodiment.

In step S1702, the CPU 206, functioning as the terminal state acquirer 216, acquires the state of the LTE interface 202 and the state of the WLAN interface 204.

In step S1704, the CPU 206, functioning as the LA preferability determiner 220, determines whether LA is preferred for the subsequent flow for a response packet.

The LTE interface 202 is in an idle state (step S1706).

In step S1708, the WLAN interface 204 transmits a response packet. Specifically, the case where it is determined that the LTE interface 202 is in an idle state and LA is not preferred (No. 6) applies at this point. Additionally, the case where it is determined that both the LTE interface 202 and the WLAN interface 204 are in a normal state and LA is not preferred (No. 8) also applies. The response packet transmitted from the WLAN interface 204 of the terminal 200 is transmitted to the WLAN access point 400.

In step S1710, the WLAN access point 400 transmits the response packet from the terminal 200 to the hub 500.

In step S1712, the hub 500 transmits the response packet from the WLAN access point 400 to the peer 600.

In step S1714, the peer 600 transmits the subsequent flow for the response packet received in step S1712 to the WLAN interface 204. The subsequent flow for the response packet is transmitted to the terminal 200 via the hub 500 and the WLAN access point 400. The flow is received by the WLAN interface 204 of the terminal 200.

According to the sequence chart illustrated in FIG. 17, the femto base station 300 does not use LA on the subsequent flow for the response packet. However, this is not problematic, since LA is not preferred for that flow in the first place.

By doing the above, the LTE interface 202 is not switched from an idle state to a normal state in response to a flow for which LA is not preferred. Since the LTE interface 202 is not switched to a normal state in response to a flow for which LA is not preferred, power consumption may be reduced.

According to this embodiment, the terminal 200 is able to select the interface from which to output a response packet, depending on the state of each interface equipped in the terminal 200 and whether LA is preferred for the flow. Since there may be less switching of the LTE interface 202 from an idle state to a normal state, power consumption may be reduced.

Second Embodiment

Wireless Communication System

A wireless communication system 100 according to the second embodiment is mostly the same as the wireless communication system 100 illustrated in FIG. 8.

Femto Base Station 300

Figure 18:
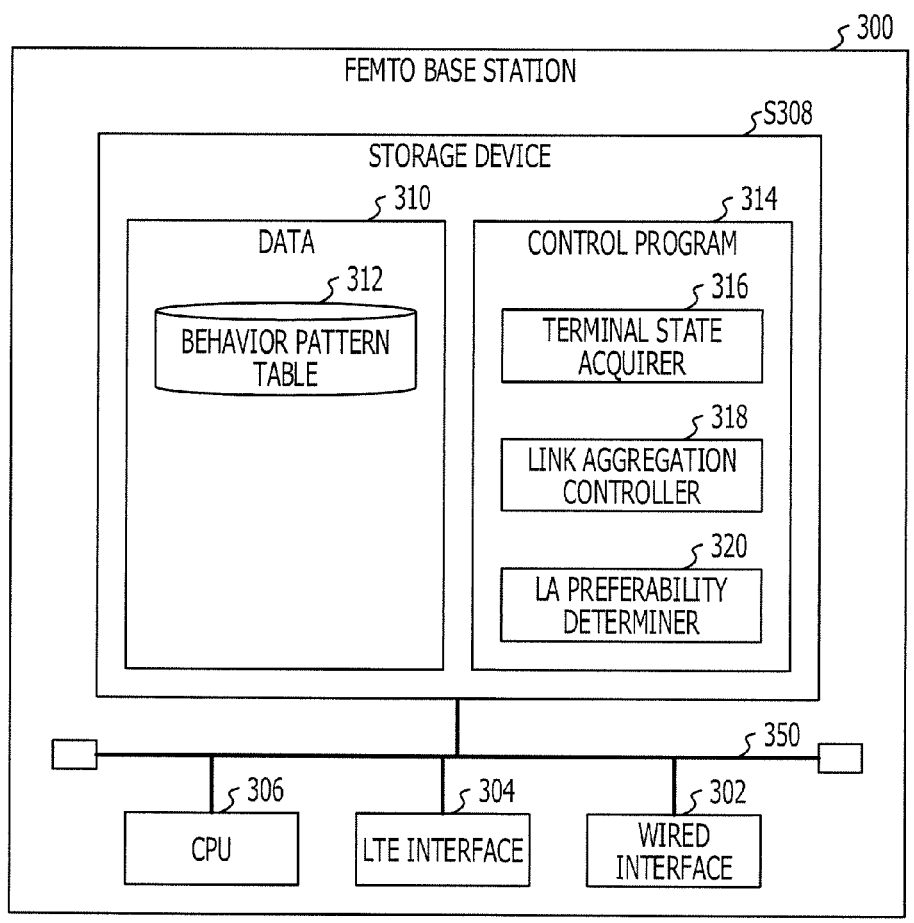
FIG. 18 illustrates a femto base station according to an embodiment.

FIG. 18 illustrates a femto base station 300 according to an embodiment. A femto base station 300 according to an embodiment will be described for when an LTE interface that conducts wireless communication by LTE is included. However, the femto base station 300 may be configured to include an interface that conducts wireless communication by using another wireless communication technology.

The femto base station 300 includes a wired interface 302, an LTE interface 304, a CPU 306, and storage device 308. The wired interface 302, the LTE interface 304, the CPU 306, and the storage device 308 are coupled by a bus 350.

The storage device 308 stores data 310 and a control program 314. The data 310 includes a behavior pattern table 312. The control program 314 includes a program that causes the CPU 306 to function as a terminal state acquirer 316, a program that causes the CPU 306 to function as a link aggregation controller 318, and a program that causes the CPU 306 to function as an LA preferability determiner 320. These programs may be provided in prerecorded state on a recording medium such as a floppy disk, CD-ROM, or memory card, for example, but may also be provided by being made downloadable via a communication network.

Operation as the femto base station 300 is achieved by the CPU 306 operating in accordance with the control program 314. In other words, by operating in accordance with the control program 314, the CPU 306 functions as the terminal state acquirer 316. The terminal state acquirer 316 acquires information indicating the state of each interface included in the terminal 200. In addition, by operating in accordance with the control program 314, the CPU 306 functions as the link aggregation controller 318. The link aggregation controller 318 applies control so as to transmit multicast packets, broadcast packets, or unicast packets to the terminal 200 using LA. Also, by operating in accordance with the control program 314, the CPU 306 functions as the LA preferability determiner 320. The LA preferability determiner 320 determines whether LA is preferred for a flow.

The wired interface 302 transmits and receives data to and from the hub 500. The wired interface 302 and the hub 500 may also be coupled by optical fiber, for example.

The LTE interface 304 wirelessly communicates with the terminal 200 by using the LTE standard.

By operating in accordance with the control program 314, the CPU 306 controls the wired interface 302, the LTE interface 304, and the storage device 308.

Terminal 200

Figure 19:
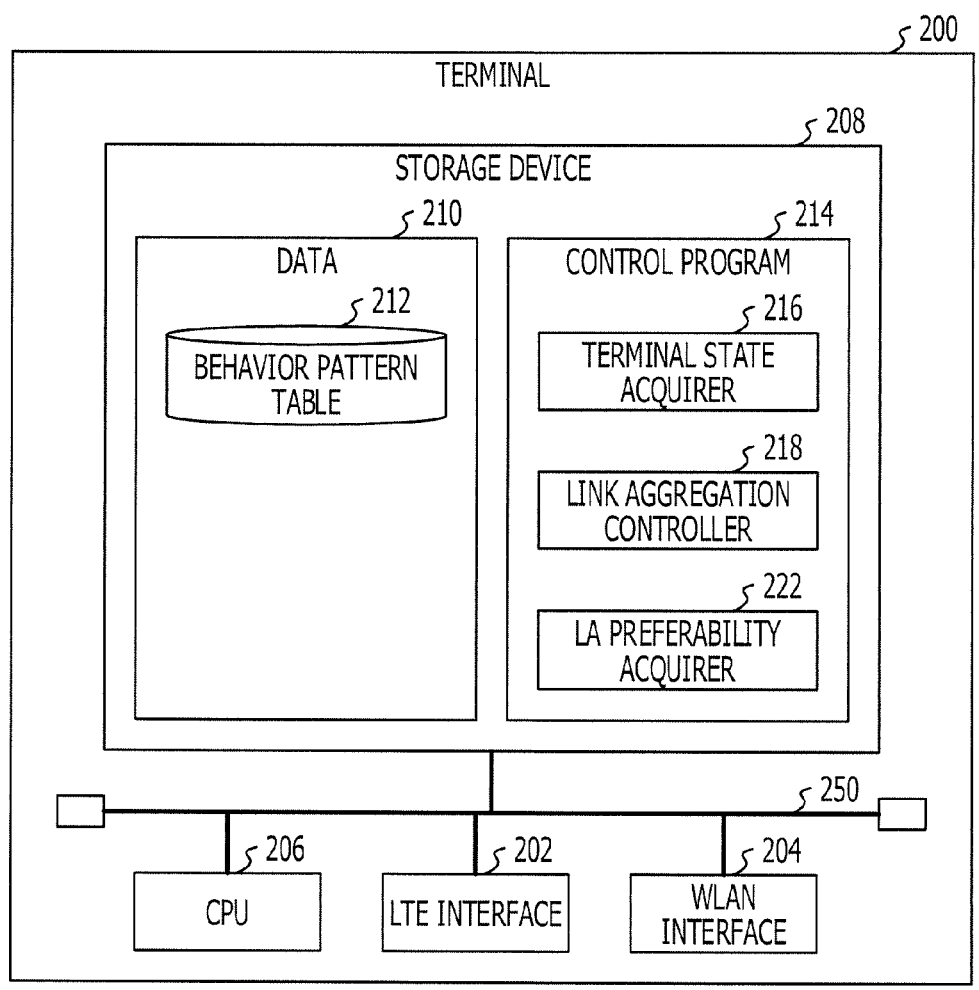
FIG. 19 illustrates a terminal according to an embodiment.

FIG. 19 illustrates a terminal 200 according to an embodiment. A terminal 200 according to an embodiment will be described for the case where an LTE interface 202 that conducts wireless communication by using the LTE standard and a WLAN interface 204 are included. However, the terminal 200 may be configured to include multiple interfaces that conduct wireless communication by using other wireless communication technologies.

The terminal 200 includes an LTE interface 202, a WLAN interface 204, a CPU 206, and storage device 208. The LTE interface 202, the WLAN interface 204, the CPU 206, and the storage device 208 are coupled by a bus 250.

The storage device 208 stores data 210 and a control program 214. The data 210 includes a behavior pattern table 212. The control program 214 includes a program that causes the CPU 206 to function as a terminal state acquirer 216, a program that causes the CPU 206 to function as a link aggregation controller 218, and a program that causes the CPU 206 to function as an LA preferability acquirer 222. These programs may be provided in prerecorded state on a recording medium such as a floppy disk, CD-ROM, or memory card, for example, but may also be provided by being made downloadable via a communication network.

Operation as the terminal 200 is achieved by the CPU 206 operating in accordance with the control program 214. In other words, by operating in accordance with the control program 214, the CPU 206 functions as the terminal state acquirer 216. The terminal state acquirer 216 acquires information indicating the state of each interface included in the terminal 200. In addition, by operating in accordance with the control program 214, the CPU 206 functions as the link aggregation controller 218. The link aggregation controller 218 applies control to receive multicast packets, broadcast packets, or unicast packets transmitted by the femto base station 300 using the LA feature. Also, by operating in accordance with the control program 214, the CPU 206 functions as the LA preferability acquirer 222. The LA preferability acquirer 222 acquires information indicating whether multicast packets or broadcast packets transmitted by the femto base station 300 will be transmitted using LA.

The LTE interface 202 wirelessly communicates with the femto base station 300 by using the LTE standard.

The WLAN interface 204 wirelessly communicates with the WLAN access point 400 by using a WLAN technology.

By operating in accordance with the control program 214, the CPU 206 controls the LTE interface 202, the WLAN interface 204, and the storage device 208.

Operation of wireless communication system 100 (1)

Figure 20:
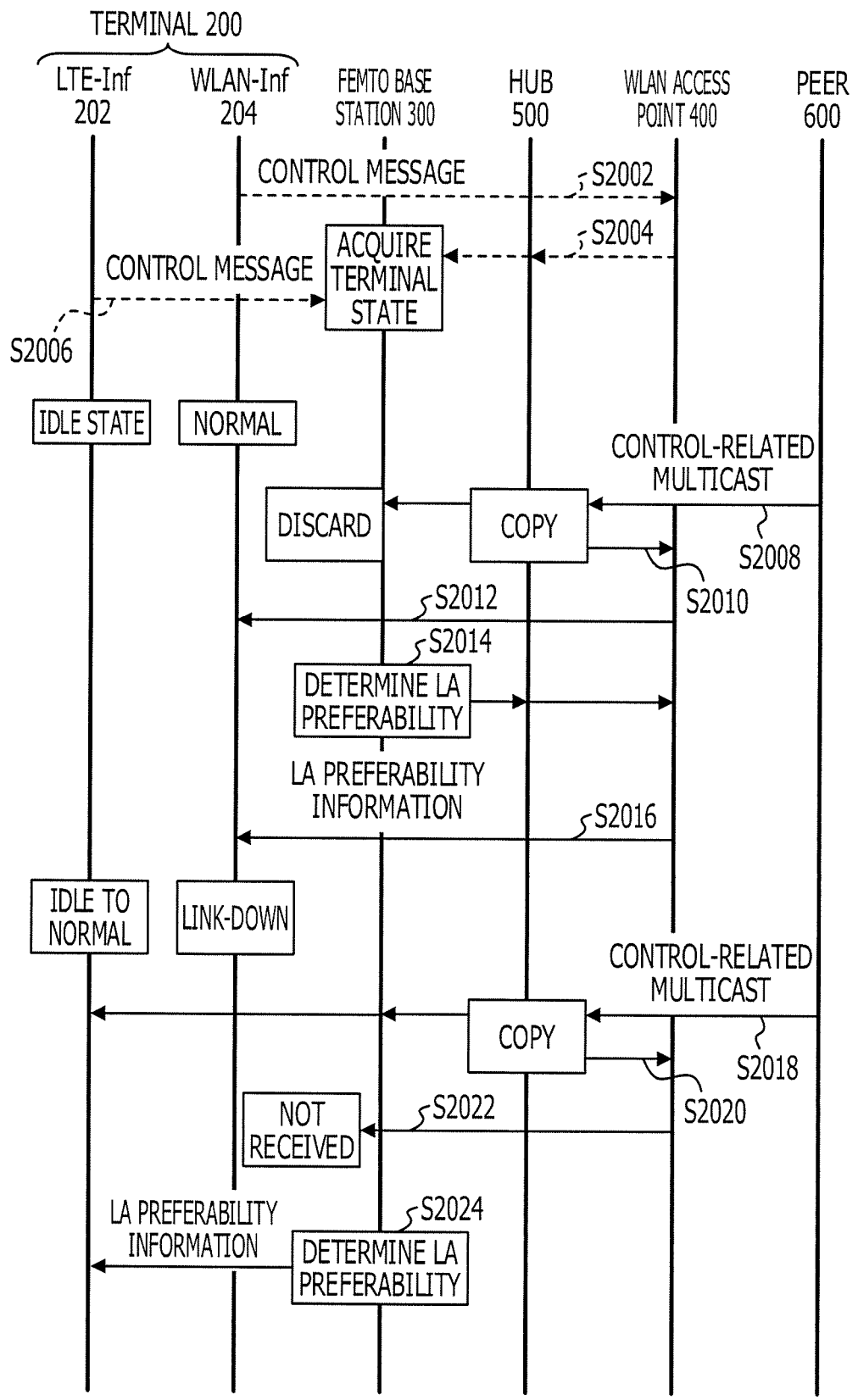
FIG. 20 is a sequence chart illustrating operation of a wireless communication system according to an embodiment.

FIG. 20 illustrates operation of a wireless communication system 100 according to an embodiment. Although control-related multicast packets are illustrated in FIG. 20 as an example, the concept is similar for broadcast packets.

In step S2002, the WLAN interface 204 transmits a control message to the femto base station 300. The control message contains information indicating the state of an interface in the terminal 200. The control message from the terminal 200 is transmitted to the WLAN access point 400.

In step S2004, the WLAN access point 400 transmits the control message that is from the terminal 200 to the femto base station 300. The femto base station 300 acquires the information indicating the state of an interface contained in the control message from the terminal 200.

In step S2006, the LTE interface 202 transmits a control message to the femto base station 300. The femto base station 300 acquires the information indicating the state of an interface contained in the control message from the terminal 200.

The case where the LTE interface 202 of the terminal 200 is in an idle state and the WLAN interface 204 is in a normal state will now be described.

In step S2008, a control-related multicast packet from the peer 600 is transmitted to the femto base station 300 via the hub 500. The femto base station 300, following the behavior pattern table 312 illustrated in FIG. 12, discards the control-related multicast packet from the hub 500.

In step S2010, the hub 500 copies the control-related multicast packet from the peer 600. The hub 500 transmits the copied control-related multicast packet to the terminal 200. The control-related multicast packet copied by the hub 500 is transmitted to the WLAN access point 400.

In step S2012, the WLAN access point 400 transmits the control-related multicast packet from the hub 500 to the terminal 200. The control-related multicast packet from the WLAN access point 400 is received by the WLAN interface 204 of the terminal 200.

In step S2014, the CPU 306, functioning as the LA preferability determiner 320 of the femto base station 300, determines whether LA is preferred for the subsequent flow for the response packet for the control-related multicast packet transmitted from the peer 600. The CPU 306, functioning as the LA preferability determiner 320, reports to the terminal 200 with LA preferability information indicating whether LA is preferred for the flow. The LA preferability information is transmitted to the WLAN access point 400.

In step S2016, the WLAN access point 400 transmits the LA preferability information from the femto base station 300 to the terminal 200.

The case where the WLAN interface 204 of the terminal 200 is in a link-down state will now be described.

In step S2018, a control-related multicast packet from the peer 600 is transmitted to the femto base station 300 via the hub 500. The femto base station 300 transmits the control-related multicast packet from the hub 500 to the terminal 200. The LTE interface 202 of the terminal 200 receives the control-related multicast packet from the femto base station 300.

In step S2020, the hub 500 copies the control-related multicast packet from the peer 600. The hub 500 transmits the copied control-related multicast packet to the terminal 200. The control-related multicast packet copied by the hub 500 is transmitted to the WLAN access point 400.

In step S2022, the WLAN access point 400 transmits the control-related multicast packet from the hub 500 to the terminal 200. Since the WLAN interface 204 of the terminal 200 is in a link-down state, the control-related multicast packet from the WLAN access point 400 is not received.

In step S2024, the CPU 306, functioning as the LA preferability determiner 320 of the femto base station 300, determines whether LA is preferred for the subsequent flow for the response packet for the control-related multicast packet transmitted from the peer 600. The CPU 306, functioning as the LA preferability determiner 320, reports to the terminal 200 with LA preferability information indicating whether LA is preferred for the flow. The LA preferability information is transmitted to the terminal 200.

Operation of Wireless Communication System 100 (2)

Figure 21:
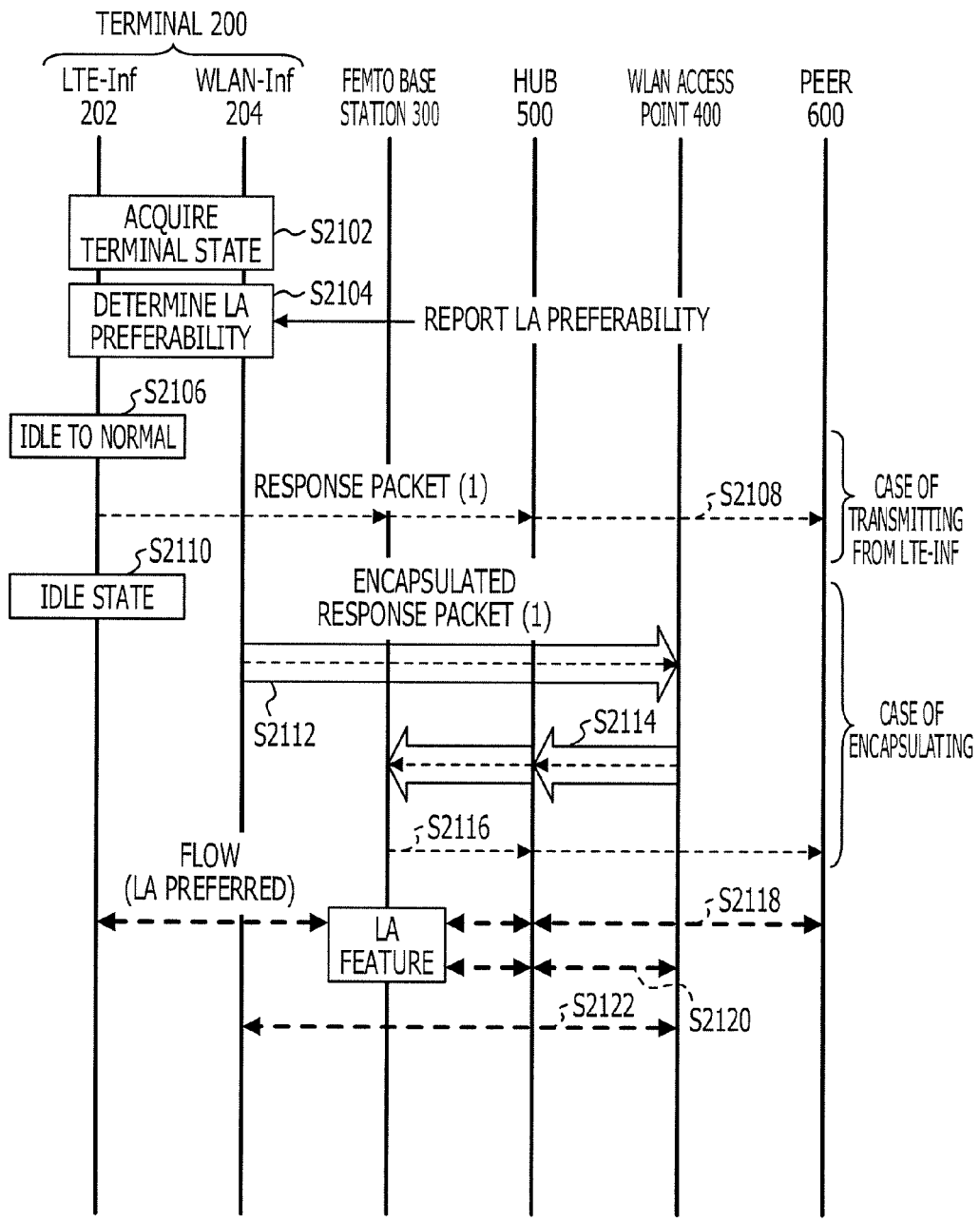
FIG. 21 is a sequence chart illustrating operation of a wireless communication system according to an embodiment.

FIG. 21 illustrates operation of a wireless communication system 100 according to an embodiment.

In step S2102, the CPU 206, functioning as the terminal state acquirer 216, acquires the state of the LTE interface 202 and the state of the WLAN interface 204.

In step S2104, the CPU 206, functioning as the LA preferability acquirer 222, acquires LA preferability information indicating whether LA is preferred for the subsequent flow for the response packet for the control-related multicast packet.

The case where LA is preferred for the subsequent flow and a response packet is transmitted from the LTE interface 202 will now be described.

In step S2106, the CPU 206, functioning as the link aggregation controller 218, switches the LTE interface 202 to a normal state as appropriate.

In step S2108, the LTE interface 202 transmits a response packet.

Specifically, the case where it is determined that the LTE interface 202 is in a normal state and that LA is preferred (No. 3), and the case where it is determined that the LTE interface 202 is in an idle state and that LA is preferred (No. 5) are applicable at this point. In addition, the case where the LTE interface 202 is in a normal state and the WLAN interface 204 is in a link-down state (No. 7) also applies even when it is determined that LA is not preferred.

The response packet transmitted from the LTE interface 202 of the terminal 200 is transmitted to the peer 600 via the femto base station 300 and the hub 500.

The case where LA is preferred for the subsequent flow and a response packet is encapsulated with the address of the femto base station 300 and transmitted from the WLAN interface 204 will now be described.

The LTE interface 202 is in an idle state (step S2110).

In step S2112, the WLAN interface 204 encapsulates and transmits a response packet (1) that is encapsulated with the address of the femto base station 300. Specifically, the case where it is determined that the LTE interface 202 is in an idle state and LA is preferred (No. 4) applies at this point. The WLAN interface 204 encapsulates a response packet whose source is the LTE interface 202 and whose destination is the peer 600 with a delivery header that indicates the WLAN interface 204 as the source and the femto base station 300 as the destination. The response packet is transmitted to the WLAN access point 400.

In step S2114, the WLAN access point 400 forwards the response packet that is transmitted from the WLAN interface 204 of the terminal 200 to the hub 500. The hub 500 forwards the response packet from the WLAN access point 400 to the femto base station 300.

In step S2116, the femto base station 300 forwards the response packet from the hub 500 to the peer 600. The femto base station 300 decapsulates the response packet from the hub 500 and transmits the decapsulated packet to the peer 600. The decapsulated response packet from the femto base station 300 is forwarded to the peer 600 via the hub 500.

In step S2118, the peer 600 transmits the subsequent flow for the response packet received in step S2108 to the LTE interface 202. The subsequent flow for the response packet is transmitted to the terminal 200 via the femto base station 300. The LTE interface 202 of the terminal 200 receives the flow from the femto base station 300.

Alternatively, the peer 600 transmits the subsequent flow for the response packet which was decapsulated in step S2118 to the LTE interface 202. This is because the LTE interface 202 is the source of the decapsulated response packet. The peer 600 thus interprets the response packet as having been transmitted from the LTE interface 202.

The subsequent flow for the response packet is transmitted to the terminal 200 by the femto base station 300 with control applied to use LA. The LTE interface 202 of the terminal 200 receives the flow from the femto base station 300.

In step S2120, the CPU 306, functioning as the link aggregation controller 318, applies control to use LA on the subsequent flow for the response packet. Specifically, the CPU 306, functioning as the link aggregation controller 318, applies control to enable LA with respect to the WLAN access point 400.

In step S2122, the WLAN access point 400 transmits the subsequent flow for the response packet to the terminal 200.

Packets included in the subsequent flow from the femto base station 300 may contain information that differs from packets included in the subsequent flow from the WLAN access point 400. For example, the femto base station 300 and the WLAN access point 400 may be configured to sequentially transmit packets that are included in the subsequent flow.

In steps S2118 to S2122, the CPU 306, functioning as the link aggregation controller 318 of the femto base station 300, may also use an LTE link and a WLAN link without using LA on the flow.

Additionally, it may also be configured such that the CPU 306, functioning as the link aggregation controller 318 of the femto base station 300, applies control to forward the flow based on moment-to-moment changes in congestion conditions on each link, for example. Specifically, the CPU 306, functioning as the link aggregation controller 318 of the femto base station 300, may be configured to apply control to forward the flow using either or both an LTE link and a WLAN link. LA is compatible with the case of forwarding the flow by simultaneously using both an LTE link and a WLAN link.

Depending on the power-saving states of interfaces for the terminal 200 and whether LA is preferred, the terminal 200 transmits response packets from the LTE interface 202 or transmits encapsulated response packets from the WLAN interface 204. In so doing, the terminal 200 is able to receive the transmitted subsequent flows using LA where appropriate.

According to this embodiment, the femto base station 300 is able to determine whether LA is preferred for a flow. In addition, the femto base station 300 is able to report to the terminal 200 with the results of determining whether LA is preferred for a flow.

According to this embodiment, the terminal 200 is able to select the interface from which to output a response packet, depending on the state of each interface in the terminal 200 and whether LA is preferred for the flow. For this reason, since there may be less switching of the LTE interface 202 from an idle state to a normal state, power consumption may be reduced.

Third Embodiment

Wireless Communication System

A wireless communication system 100 according to the third embodiment is mostly the same as the wireless communication system 100 illustrated in FIG. 8.

Femto Base Station 300

A femto base station 300 according to the third embodiment is mostly the same as the femto base station 300 illustrated in FIG. 9.

Terminal 200

Figure 22:
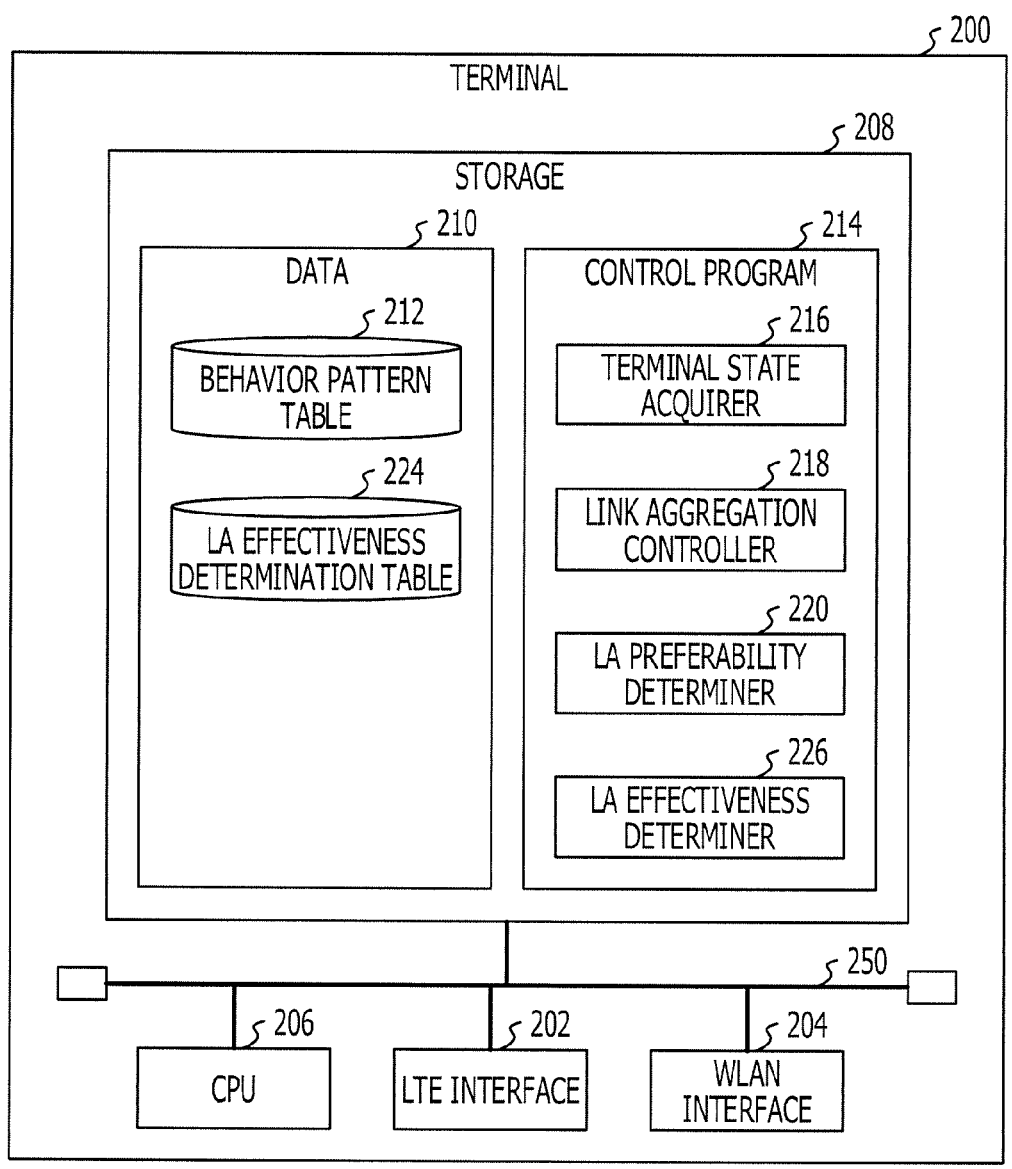
FIG. 22 illustrates a terminal according to an embodiment.

FIG. 22 illustrates a terminal 200 according to the third embodiment. A terminal 200 according to the third embodiment will be described for the case where an LTE interface 202 that conducts wireless communication by using the LTE standard and a WLAN interface 204 are included. However, the terminal 200 may be configured to include interfaces that conduct wireless communication by using other wireless communication technologies.

In a terminal 200 according to this embodiment, an LA effectiveness determination table 224 is included among the data 210 that is in the terminal 200, which is described with reference to FIG. 10. In addition, a program that causes the CPU 206 to function as an LA effectiveness determiner 226 is included in the control program 214. The program may be provided in prerecorded state on a recording medium such as a floppy disk, CD-ROM, or memory card, for example, but may also be provided by being made downloadable via a communication network.

Operation as the terminal 200 is achieved by the CPU 206 operating in accordance with the control program 214. In other words, by operating in accordance with the control program 214, the CPU 206 functions as the LA effectiveness determiner 226. The LA effectiveness determiner 226 determines whether LA will be effective if used.

Operation of Terminal 200

Figure 23:
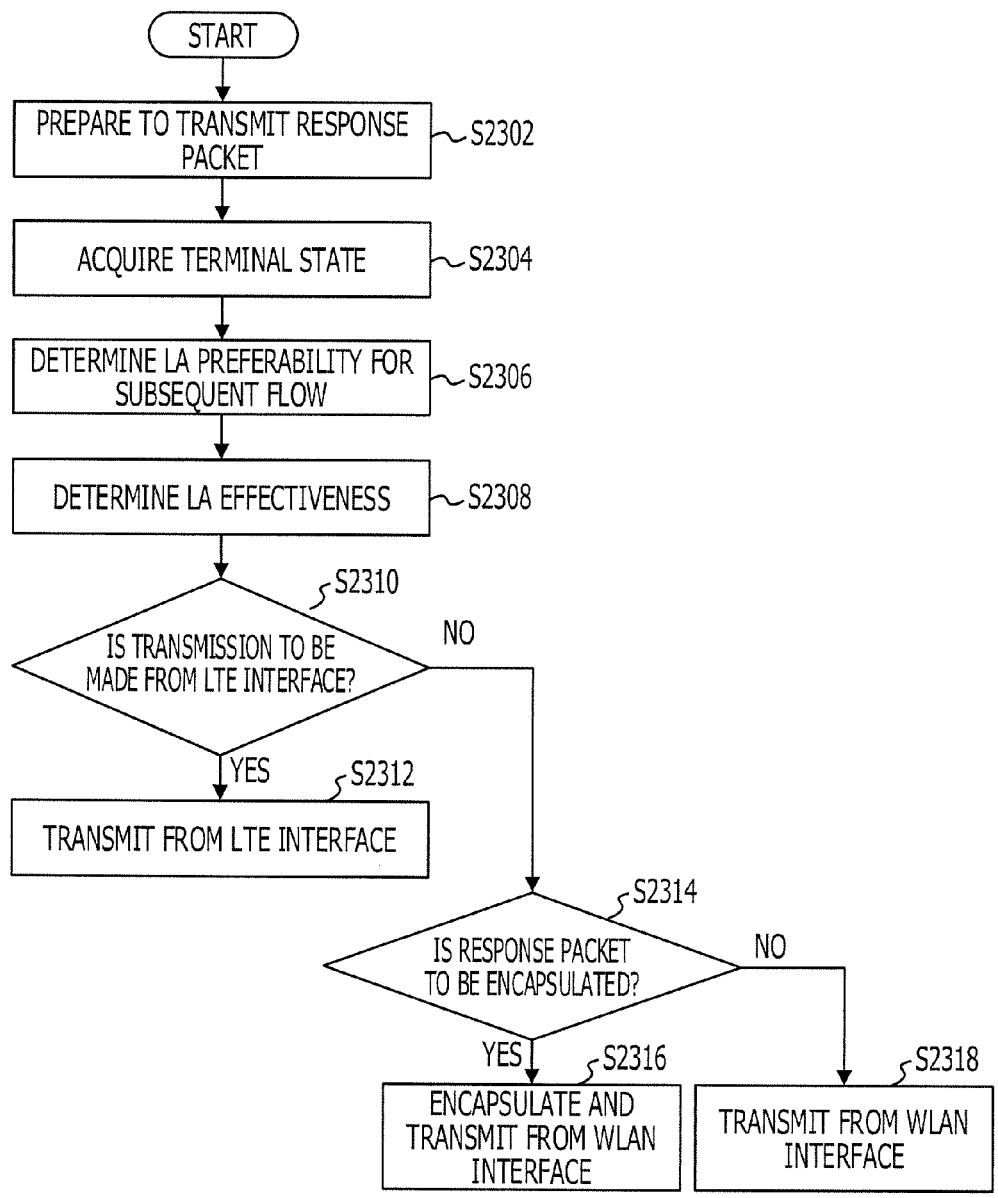
FIG. 23 is a flowchart illustrating operation of a terminal according to an embodiment.

FIG. 23 illustrates operation of a terminal 200 according to an embodiment.

In step S2302, the CPU 206, functioning as the link aggregation controller 218, prepares to transmit a response packet.

In step S2304, the CPU 206, functioning as the terminal state acquirer 216, acquires the state of the LTE interface 202 and the state of the WLAN interface 204 in the terminal 200.

In step S2306, the CPU 206, functioning as the LA preferability determiner 220, determines whether LA is preferred for the flow that will follow a response packet. Specifically, the CPU 206, functioning as the LA preferability determiner 220, may be configured to determine whether LA is preferred based on the protocol of the flow that will follow the response packet. For example, the CPU 206 may function as the LA preferability determiner 220 to determine that LA is preferred for a high-throughput protocol such as a video-related flow.

Additionally, when the response packet, or in other words the route determination packet, is a flow start packet for a unicast flow, the CPU 206, functioning as the LA preferability determiner 220, may be configured to determine whether the data attempted to be acquired with the unicast flow is video-related, and thereby determine whether LA is preferred.

Furthermore, when the response packet, or in other words the route determination packet, is an IGMP Join message, the CPU 206, functioning as the LA preferability determiner 220, may be configured to determine whether LA is preferred based on the multicast address that is to be joined. This is because it may be determined whether a flow is video-related according to the multicast address that is to be joined.

In step S2308, the CPU 206, functioning as the LA effectiveness determiner 226, references the LA effectiveness determination table 224 and determines whether LA will be effective if used.

FIG. 24 illustrates an LA effectiveness determination table 224 according to an embodiment.

The LA effectiveness determination table 224 contains information indicating whether LA is preferred (LA preferability), the reception quality of wireless signals on the LTE link (LTE reception), the reception quality of wireless signals on the WLAN link (WLAN reception), and the LA effectiveness.

Regarding whether reception is good, it may be configured such that reception is determined to be good when the signal to interference-plus-noise ratio (SINR) of a wireless signal exceeds a preset threshold, for example. The threshold for the LTE link may be set differently from the threshold for the WLAN link. If the reception on a wireless link is good, a high throughput may be obtained, and in addition, the power expenditure for transferring a single bit may decrease. Conversely, if the reception on a wireless link is poor, only a low throughput may be obtained, and in addition, the power expenditure for transferring a single bit may increase. LA is a technology that raises the overall throughput of a flow by using multiple wireless links. Consequently, adding a wireless link with poor reception when using LA may result in increased power expenditure for a comparatively small degree of improvement in throughput, lowering the effectiveness of LA.

In No. 101, it is determined that using LA will be highly effective when it is determined that LA is preferred for the subsequent flow and LTE reception and WLAN reception are both good.

In No. 102, it is determined that using LA will be lowly effective when, although it is determined that LA is preferred for the subsequent flow, either or both of the LTE reception and the WLAN reception are poor.

In No. 103, it is determined that LA will be lowly effective when it is determined that LA is not preferred for the subsequent flow, irrespective of whether the LTE reception and the WLAN reception are good or poor.

In step S2310, the CPU 206, functioning as the link aggregation controller 218, determines whether to transmit a response packet from the LTE interface 202. Specifically, the CPU 206, functioning as the link aggregation controller 218, references the behavior pattern table 212 and determines the interface from which to transmit a response packet.

The CPU 206, functioning as the link aggregation controller 218, references the behavior pattern table 212. The CPU 206, functioning as the link aggregation controller 218, acquires information indicating the state of each interface from the terminal state acquirer 216. In addition, the CPU 206, functioning as the link aggregation controller 218, acquires information indicating whether LA is preferred for the subsequent flow from the LA preferability determiner 220. The CPU 206, functioning as the link aggregation controller 218, acquires information indicating whether using LA will be effective from the LA effectiveness determiner 226. The CPU 206, functioning as the link aggregation controller 218, determines the interface from which to transmit a response packet based on the information indicating the state of each interface, the information indicating whether LA is preferred for the subsequent flow, and the information indicating whether using LA will be effective.

FIG. 25 illustrates a behavior pattern table 212 according to an embodiment.

The behavior pattern table 212 illustrated in FIG. 25 contains information indicating whether LA will be effective in the "Subsequent flow" field of the behavior pattern table 212 described with reference to FIG. 14.

The behavior pattern table 212 illustrated in FIG. 25 associates together information indicating packet types, information indicating the state of the LTE interface 202, information indicating the state of the WLAN interface 204, and information indicating whether LA will be effective for the subsequent flow. Additionally, the behavior pattern table 212 illustrated in FIG. 25 associates together operational policies and LA-related behaviors. "DC" means "Don't Care".

No. 3 corresponds to the case where the LTE interface 202 is in a normal state, and using LA will be highly effective for the subsequent flow. In this case, the CPU 206, functioning as the link aggregation controller 218 of the terminal 200, applies control so as to transmit a response packet from the LTE interface 202. Applying control so as to transmit a response packet from the LTE interface 202 enables the highly effective use of LA for the subsequent flow.

No. 4 corresponds to the case where the LTE interface 202 is in an idle state, and using LA will be highly effective for the subsequent flow. In this case, the CPU 206, functioning as the link aggregation controller 218 of the terminal 200, applies control so as to transmit a response packet according to the operational policy setting. Specifically, the CPU 206, functioning as the link aggregation controller 218 of the terminal 200, encapsulates a response packet with the address of the femto base station 300 and transmits the result from the WLAN interface 204. When the WLAN interface 204 is in a link-down state, the CPU 206, functioning as the link aggregation controller 218 of the terminal 200, establishes a link with the WLAN interface 204. The CPU 206, functioning as the link aggregation controller 218 of the terminal 200, applies control so as to transmit the encapsulated response packet from the WLAN interface 204 after establishing a link. The femto base station 300 may not be able to directly establish a link with the WLAN interface 204 of the terminal 200. However, the terminal 200 is able to establish a link with the terminal's own WLAN interface 204.

Encapsulating the response packet increases the packet length and incurs overhead. However, by transmitting from the WLAN interface 204, switching power to switch the LTE interface 202 to a normal state is not consumed. Additionally, although power is consumed when establishing a link with the WLAN interface 204, it is anticipated that such power expenditure will be less than the switching power for the LTE interface 202.

Meanwhile, it is also anticipated that in some cases a wireless connection may not be established after attempting to establish a link with the WLAN interface 204, because radio waves from the WLAN access point 400 are not reaching the WLAN interface 204. In this case, the CPU 206, functioning as the link aggregation controller 218 of the terminal 200, may be configured to conduct the following processing. Namely, the CPU 206, functioning as the link aggregation controller 218 of the terminal 200, switches the LTE interface 202 to a normal state. The CPU 206, functioning as the link aggregation controller 218 of the terminal 200, applies control to transmit a response packet from the LTE interface 202.

No. 5 corresponds to the case where the LTE interface 202 is in an idle state, and using LA will be highly effective for the subsequent flow. In this case, the CPU 206, functioning as the link aggregation controller 218 of the terminal 200, applies control so as to transmit a response packet according to the operational policy setting. Specifically, the CPU 206, functioning as the link aggregation controller 218 of the terminal 200, transmits a response packet from the LTE interface 202.

Switching power is consumed when switching the LTE interface 202 from an idle state to a normal state. However, using LA may be highly effective for the subsequent flow for the response packet. For this reason, the LTE interface 202 is switched from an idle state to a normal state, and a response packet is transmitted from the LTE interface 202.

The question of whether to operate according to No. 4 or No. 5 depends on the operational policy. In other words, operation obeys the operational policy settings.

No. 6 corresponds to the case where the LTE interface 202 is in an idle state, and it is determined that LA will be lowly effective for the subsequent flow. In this case, the CPU 206, functioning as the link aggregation controller 218 of the terminal 200, applies control so as to transmit a response packet from the WLAN interface 204. When the WLAN interface 204 is in a link-down state, the CPU 206, functioning as the link aggregation controller 218 of the terminal 200, establishes a link with the WLAN interface 204. The CPU 206, functioning as the link aggregation controller 218 of the terminal 200, transmits the response packet from the WLAN interface 204 after establishing a link. Although power is consumed when establishing a link with the WLAN interface 204, it is anticipated that such power expenditure will be less than the switching power for the LTE interface 202.

Meanwhile, it is also anticipated that in some cases a wireless connection may not be established after attempting to establish a link with the WLAN interface 204, because radio waves from the WLAN access point 400 are not reaching the WLAN interface 204. In this case, the CPU 206, functioning as the link aggregation controller 218 of the terminal 200, may be configured to conduct the following processing. Namely, the CPU 206, functioning as the link aggregation controller 218 of the terminal 200, switches the LTE interface 202 to a normal state. The CPU 206, functioning as the link aggregation controller 218 of the terminal 200, applies control to transmit a response packet from the LTE interface 202. Thus, needless consumption of the switching power of the LTE interface 202 may be avoided for flows where LA is not used.

No. 7 corresponds to the case where the LTE interface 202 is in a normal state, the WLAN interface 204 is in a link-down state, and it is determined that using LA will be lowly effective for the subsequent flow. In this case, the CPU 206, functioning as the link aggregation controller 218 of the terminal 200, transmits a response packet from the LTE interface 202. Since using LA would be lowly effective for the subsequent flow, it is not preferable to transmit a response packet from the LTE interface 202. However, since the WLAN interface 204 is in a link-down state, a response packet is transmitted from the LTE interface 202 in order to save power. Thus, the power consumed to establish a link with the WLAN interface 204 may be saved.

No. 8 corresponds to the case where the LTE interface 202 is in a normal state, the WLAN interface 204 is in a normal state, and it is determined that using LA will be lowly effective for the subsequent flow. In this case, the CPU 206, functioning as the link aggregation controller 218 of the terminal 200, applies control so as to transmit a response packet from the interface with the better reception from out of the LTE interface 202 and the WLAN interface 204. The LTE interface 202 and the WLAN interface 204 are both in a normal state, but additionally using LA would be lowly effective. For this reason, transmitting a response packet from either interface is acceptable. However, from the perspective of higher throughput and reduced power consumption, the wireless link with the better reception is preferred for use by the subsequent flow for the response packet. Consequently, a response packet is transmitted from the interface with the better reception.

When it is determined in step S2310 that a response packet is to be transmitted from the LTE interface 202, in step S2312 the CPU 206, functioning as the link aggregation controller 218, applies control to transmit the response packet from the LTE interface 202.

When it is determined in step S2310 that a response packet is not to be transmitted from the LTE interface 202, in step S2314 the CPU 206, functioning as the link aggregation controller 218, determines whether to encapsulate the response packet and send the encapsulated response packet.

When it is determined in step S2314 that the response packet is to be encapsulated, in step S2316 the CPU 206, functioning as the link aggregation controller 218, applies control so as to transmit an encapsulated response packet from the WLAN interface 204.

When it is determined in step S2314 that the response packet is to be transmitted without encapsulation, in step S2318 the CPU 206, functioning as the link aggregation controller 218, applies control so as to transmit the response packet from the WLAN interface 204.

According to this embodiment, a terminal is able to transmit a response packet on a route such that LA is enabled for the subsequent flow for the response packet, depending on the state of each interface in the terminal, whether LA is preferred for the flow, and whether LA would be highly effective for the flow. In addition, the terminal is able to determine whether LA would be highly effective based on wireless signal reception. In so doing, it is possible to reduce power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a first wireless communication apparatus wirelessly coupled to a terminal via a first wireless interface and being able to perform link aggregation with the terminal;
the terminal including the first wireless interface and a second wireless interface;
a second wireless communication apparatus wirelessly coupled to the terminal via the second wireless interface and being unable to perform link aggregation with the terminal;
a hub apparatus coupled to the first wireless communication apparatus via a first network, the second wireless communication apparatus via a second network, and a third communication apparatus via a third network respectively; and
the third communication apparatus configured to communicate with the terminal via the hub apparatus and via at least one of the first wireless communication apparatus and the second wireless communication apparatus,
wherein
the first wireless interface and the second wireless interface belong to same multicast domain,
the third communication apparatus multicasts a first packet to the same multicast domain,
the hub apparatus forwards the first packet to the first wireless communication apparatus and the second wireless communication apparatus, and
the terminal is configured to transmit a first second packet to the third communication apparatus in response to the first packet, the second packet requesting the third communication apparatus to transmit a traffic flow to the terminal, the second packet being transmitted from the terminal via one of the first wireless interface and the second wireless interface that is selected based on whether to request to apply link aggregation to the requested traffic flow regardless of which of the first wireless interface and the second wireless interface has been used for receiving the first packet.

2. The wireless communication system according to the claim 1, wherein the one of the first wireless interface and the second wireless interface is selected further based on operational states of the first wireless interface and the second wireless interface.

3. A wireless communication system according to claim 1, wherein
the first wireless communication apparatus receives a first signal indicating operational states of the first wireless interface and the second wireless interface from the terminal,
the first wireless communication apparatus determines whether to discard the second packet or not based on the first signal, and
the terminal receives the first packet via the second wireless communication apparatus when the first wireless communication apparatus determines to discard the first packet.

4. A wireless communication system according to claim 1, wherein
the terminal receives, from the first wireless communication apparatus, a second signal indicating a preferability of link aggregation for the traffic flow.

5. A wireless communication system according to claim 1, wherein
the second packet is transmitted to the third communication apparatus via the first wireless communication apparatus when link aggregation is applied to the traffic flow.

6. A wireless communication system according to claim 1, wherein
it is determined whether to request to apply link aggregation to the requested traffic flow or not, based on a protocol of the requested traffic flow.

7. A wireless communication system according to claim 1, wherein
the traffic flow is multicasted from the third communication apparatus.

8. A wireless communication system according to claim 1, wherein
the first wireless interface and the second wireless interface belong to same broadcast domain.

9. A wireless communication system according to claim 1, wherein
the terminal further includes a memory configured to store route information defining routes from the terminal to destinations, each route indicates a correspondence of each destination with a wireless interface that is selected from the first wireless interface and the second wireless interface for the destination, and
the one of the first wireless interface and the second wireless interface is selected without depending on the route information.

10. A wireless communication apparatus comprising:
a specific wireless interface configured to wirelessly couple to a terminal via a first wireless interface, the terminal including the first wireless interface and a second wireless interface, the specific wireless interface being used for performing link aggregation with the terminal in a wireless communication system including the wireless communication apparatus, wherein the wireless communication system further includes another wireless communication apparatus wirelessly coupled to the terminal via the second wireless interface, the other wireless communication apparatus being unable to perform link aggregation with the terminal, the first wireless interface and the second wireless interface belonging to same multicast domain; and
a processor configured to:
receive a first signal indicating operational status of the first wireless interface and the second wireless interface from the terminal,
determine whether to discard a first packet or not based on the first signal, the first packet being multicasted from a third communication apparatus to the same multicast domain, the first packet being forwarded to the wireless communication apparatus and the other wireless communication apparatus by a hub apparatus, the hub apparatus being coupled to the wireless communication apparatus via a first network, the other wireless communication apparatus via a second network, and the third communication apparatus via a third network respectively, the terminal receiving the first packet via the other wireless communication apparatus when the wireless communication apparatus determines to discard the first packet, wherein the terminal is configured to transmit a second packet to the third communication apparatus in response to the first packet, the second packet requesting the third communication apparatus to transmit a traffic flow to the terminal, the second packet being transmitted from the terminal via one of the first wireless interface and the second wireless interface that is selected based on whether to request to apply link aggregation to the requested traffic flow regardless of which of the first wireless interface and the second wireless interface has been used for receiving the first packet.

11. A terminal comprising:

a first wireless interface configured to wirelessly couple to a first wireless communication apparatus, the first wireless communication apparatus being able to perform link aggregation with the terminal;

a second wireless interface configured to wirelessly couple to a second wireless communication apparatus, the second wireless communication apparatus being unable to perform link aggregation with the terminal, the first wireless interface and the second wireless interface belonging to same multicast domain; and a processor configured to:

receive a first packet that is multicasted from a third communication apparatus to the same multicast domain, the first packet being forwarded to the first wireless communication apparatus and the second wireless communication apparatus by a hub apparatus, the hub apparatus being coupled to the first wireless communication apparatus via a first network, the second wireless communication apparatus via a second network, and the third communication apparatus via a third network respectively, transmit a first second packet to the third communication apparatus in response to the first packet, the second packet requesting the third communication apparatus to transmit a traffic flow to the terminal, the second packet being transmitted from the terminal via one of the first wireless interface and the second wireless interface that is selected based on whether to request to apply link aggregation to the requested traffic flow regardless of which of the first wireless interface and the second wireless interface has been used for receiving the first packet.

\* \* \* \* \*